(12) United States Patent
Nakashima et al.

(10) Patent No.: US 8,527,110 B2
(45) Date of Patent: Sep. 3, 2013

(54) CHARGE/DISCHARGE CONTROL DEVICE AND POWER GENERATION SYSTEM

(75) Inventors: Takeshi Nakashima, Moriguchi (JP); Souichi Sakai, Moriguchi (JP); Ryuzo Hagihara, Moriguchi (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 13/426,128

(22) Filed: Mar. 21, 2012

(65) Prior Publication Data

US 2012/0239214 A1   Sep. 20, 2012

Related U.S. Application Data

(63) Continuation of application No. PCT/JP2010/066956, filed on Sep. 29, 2010.

(30) Foreign Application Priority Data

Sep. 30, 2009  (JP) ................................. 2009-227970
Mar. 30, 2010  (JP) ................................. 2010-077234

(51) Int. Cl.
*H02J 7/04* (2006.01)
(52) U.S. Cl.
USPC .......................................... 700/297; 320/155
(58) Field of Classification Search
None
See application file for complete search history.

(56) References Cited

U.S. PATENT DOCUMENTS

2012/0176095 A1*   7/2012   Okuda et al. ................... 320/134
2012/0274288 A1*  11/2012   Wegener ........................ 320/166

FOREIGN PATENT DOCUMENTS

| JP | 2006-287998 A | 10/2006 |
| JP | 2007-228737   | 9/2007  |
| JP | 2009-65787 A  | 3/2009  |
| JP | 2010-220406 A | 9/2010  |

OTHER PUBLICATIONS

International Search Report for International Application No. PCT/JP2010/066956, dated Dec. 28, 2010, with English translation.

* cited by examiner

*Primary Examiner* — Ryan Jarrett
(74) *Attorney, Agent, or Firm* — Cantor Colburn LLP

(57) ABSTRACT

A charge/discharge control device capable of increasing the lifetime of a storage portion while suppressing effects of fluctuation in power generated by a power generator on a power grid is provided. This charge/discharge control device is so formed as to start charge/discharge control of the storage portion if an amount of change in power detected by a power detection portion detecting power passing through a prescribed portion of a line between the power generator and the power grid is at least a prescribed amount of change when the detected power changes from first power to second power while the detected power does not return to power in the vicinity of the first power from the second power within a first period from a time point when the detected power changes from the first power to the second power.

20 Claims, 23 Drawing Sheets

FLOW PRIOR TO START OF CHARGE/DISCHARGE CONTROL
(FIRST EMBODIMENT)

CHARGE/DISCHARGE CONTROL DEVICE AND POWER GENERATION SYSTEM

CROSS-REFERENCE TO RELATED APPLICATION

The present application is a continuation application of International Application No. PCT/JP2010/066956, filed Sep. 29, 2010, the entire contents of which are incorporated herein by reference and priority to which is hereby claimed. The PCT/JP2010/066956 application claimed the benefit of the date of the earlier filed Japanese Patent Application Nos. JP2009-227970, filed Sep. 30, 2009, and JP2010-077234, filed Mar. 30, 2010, the entire contents of which are incorporated herein by reference, and priority to which is hereby claimed.

BACKGROUND OF THE INVENTION

1. Field of the Invention

The present invention relates to a charge/discharge control device and a power generation system, and more particularly, it relates to a charge/discharge control device employed in a power generation system including a power generator generating power with natural energy and a storage portion capable of storing power and a power generation system including a charge/discharge control device.

2. Description of the Background Art

In recent years, the number of cases in which power generators (solar cell etc.) utilizing natural energy such as wind power or sunlight is provided in consumer homes (consumer homes, factories, etc., for example) receiving AC power supply from an electricity substation has increased. Such power generators are connected to a power grid provided under the substation, and power generated by the power generators is output to in-consumer power consuming devices. Surplus power not consumed by the in-consumer power consuming devices is output to the power grid. The flow of this power from the consumer to the power grid is referred to as "reverse power flow", and power output from the consumer to the power grid is referred to as "reverse flow power".

The obligation to supply power stably is imposed on power suppliers such as electric power companies, and the power suppliers need to maintain the stability of the frequency and voltage of the overall power grid, including reverse flow power components. For example, the power suppliers maintain the stability of the frequency of the overall power grid by a plurality of control methods in correspondence with the size of a fluctuation period. Specifically, in general, in respect of a load component with a fluctuation period of at least about 20 minutes, economic dispatching control (EDC) is performed to enable output sharing of power generated in the most economical manner. This EDC is based on the daily load fluctuation expectation, and is difficult to respond to the increases and decreases in the load fluctuation from minute to minute and second to second (the components of the fluctuation period smaller than about 20 minutes). In that instance, the power companies adjust the amount of power supplied to the power grid in correspondence with the minute fluctuations in the load, and perform a plurality of controls in order to stabilize the frequency. These controls other than the EDC are called frequency controls, in particular, and the adjustments of the load fluctuation components incapable of being adjusted by the EDC are performed by these frequency controls.

More specifically, for the components with a fluctuation period of not more than about 10 seconds, their absorption is enabled naturally by self-regulating characteristics of the power grid itself. Moreover, for the components with a fluctuation period of about 10 seconds to several minutes, they can be dealt with by the governor-free operation of the power generators in each generating station. Furthermore, for the components with a fluctuation period of several minutes to about 20 minutes, they can be dealt with by load frequency control (LFC). In this load frequency control, the frequency control is performed by the adjustment of the generated power output of a generating station for LFC by means of a control signal from the central power supply command station of the power supplier.

However, the output of power generators utilizing natural energy may change sharply in correspondence with the weather and the like. This sharp change in the power output of this type of power generators has adverse effects on the degree of stability of the frequency of the linked power grid. These adverse effects become more pronounced as the number of consumers with power generators utilizing natural energy increases. As a result, in the event that the number of consumers with power generators utilizing natural energy increases even further henceforth, there will be a need arising for sustenance of the stability of the power grid by the control of the sharp change in the output of the power generators.

Therefore, in order to suppress this sharp change in the output of the power generators, a power generation system including a power generator utilizing natural energy and a storage portion capable of storing power generated by the power generator is proposed in general. Such a power generation system is disclosed in Japanese Patent Laying-Open No. 2007-228737, for example.

The aforementioned Japanese Patent Laying-Open No. 2007-228737 discloses a power generation system including a solar cell, an inverter connected to the solar cell and a power grid, and a charge/discharge portion connected to a bus connecting the inverter and the solar cell, and a storage portion connected to the charge/discharge portion. In the aforementioned Japanese Patent Laying-Open No. 2007-228737, the charge/discharge portion is controlled to perform charge/discharge of the storage portion following fluctuation in power generated by the solar cell, whereby fluctuation in power output from the inverter is suppressed. Thus, fluctuation in power output to the power gird can be suppressed and hence adverse effects on the frequency or the like of the power grid can be suppressed.

However, in the aforementioned Japanese Patent Laying-Open No. 2007-228737, the charge/discharge of the storage portion is performed each time following the fluctuation in the power generated by the power generator, and hence the charging/discharging count is increased so that the lifetime of the storage portion including a secondary cell or the like is disadvantageously decreased.

The present invention has been proposed in order to solve the aforementioned problem, and an object of the present invention is to provide a charge/discharge control device and a power generation system each capable of increasing the lifetime of a storage portion while suppressing effects of fluctuation in power generated by a power generator on a power grid.

SUMMARY OF THE INVENTION

In order to attain the aforementioned object, a charge/discharge control device according to a first aspect of the present invention is linked to a power grid, employed in a power generation system including a power generator generating power with natural energy and a storage portion capable of storing power, and controls charge/discharge of the storage portion, and further is so formed as to start charge/discharge control of the storage portion if an amount of change in power detected by a power detection portion detecting power passing through a prescribed portion of a line between the power generator and the power grid is at least a prescribed amount of change when the detected power changes from first power to second power while the detected power does not return to power in a vicinity of the first power from the second power within a first period from a time point when the detected power changes from the first power to the second power. The first power and the second power do not denote a constant value but denotes power before change and power after change in a case where there is the change of at least the prescribed amount of change in the power.

A power generation system according to a second aspect of the present invention includes a power generator linked to a power grid, generating power with natural energy, a storage portion capable of storing power, a power detection portion detecting power passing through a prescribed portion of a line between the power generator and the power grid, and a controller controlling charge/discharge of the storage portion, while the controller is so formed as to start charge/discharge control of the storage portion if an amount of change in power detected by the power detection portion is at least a prescribed amount of change when the detected power changes from first power to second power while the detected power does not return to power in a vicinity of the first power from the second power within a first period from a time point when the detected power changes from the first power to the second power.

According to the present invention, the lifetime of the storage portion can be increased while effects of fluctuation in the power generated by the power generator on the power grid are suppressed.

DESCRIPTION OF THE PREFERRED EMBODIMENTS

Figure 1:
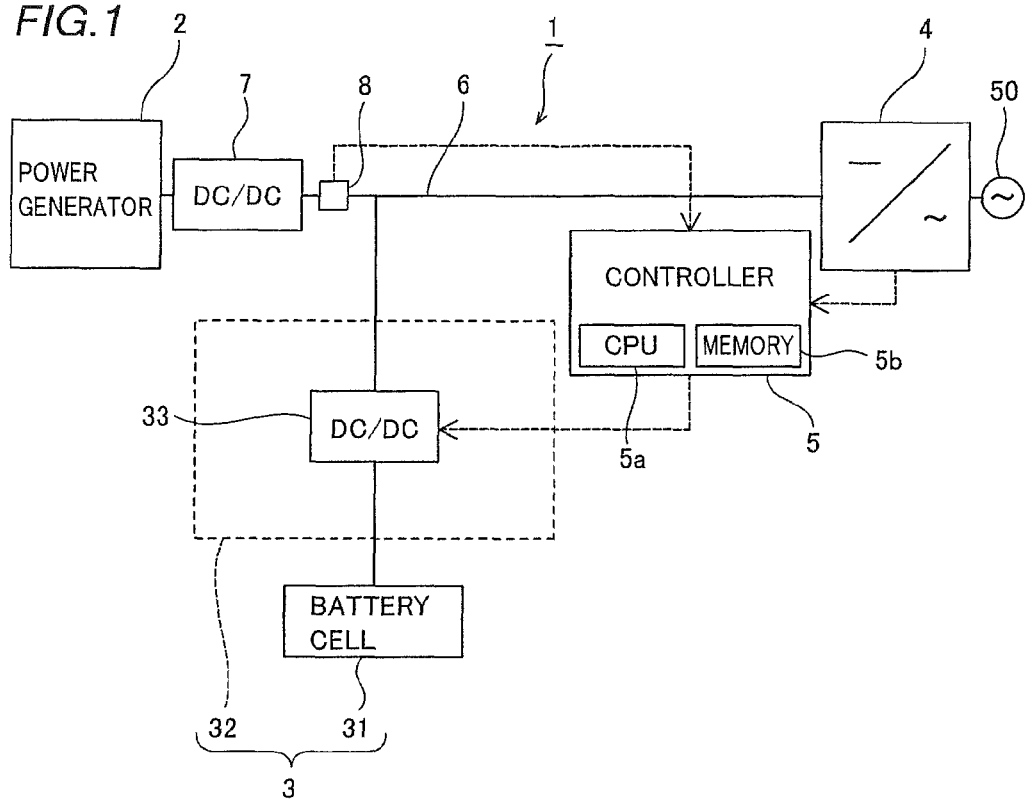
FIG. 1 is a block diagram showing the structure of a power generation system according to a first embodiment of the present invention.

Embodiments of the present invention are now described with reference to the drawings.

First Embodiment

First, the structure of a power generation system (photovoltaic power generation system 1) according to a first embodiment of the present invention is described with reference to FIGS. 1 to 7.

The photovoltaic power generation system 1 according to the first embodiment of the present invention includes a power generator 2 including a solar cell generating power with sunlight, a battery 3 capable of storing the power generated by the power generator 2, a power output unit 4 connected to a power grid 50, including an inverter outputting the power generated by the power generator 2 and the power stored in the battery 3 to the power grid 50, and a controller 5 controlling charge and discharge of the battery 3. The controller 5 is an example of the "charge/discharge control device" in the present invention.

A DC-DC converter 7 is serially connected to a DC-side bus 6 connecting the power generator 2 and the power output unit 4. The DC-DC converter 7 has a function of converting the DC voltage of the power generated by the power generator 2 to a constant DC voltage (about 260 V in the first embodiment) and outputting the same to the power output unit 4. The DC-DC converter 7 also has a so-called MPPT (maximum power point tracking) control function. The MPPT control function is a function of automatically adjusting the operating voltage of the power generator 2 so as to maximize the power generated by the power generator 2. A diode (not shown) to prevent reverse flow of current to the power generator 2 is provided between the power generator 2 and the DC-DC converter 7. The DC-DC converter 7 is an example of the "DC-DC converter" in the present invention. The DC-side bus 6 is an example of the "line" in the present invention.

The battery 3 includes a battery cell 31 connected in parallel to the DC-side bus 6 and a charge/discharge portion 32 charging and discharging the battery cell 31. As the battery cell 31, a secondary cell (a Li-ion battery cell, a Ni-MH battery cell, or the like, for example) exhibiting a small quantity of natural discharge and having high charging/discharging efficiency is employed. The voltage of the battery cell 31 is about 48 V. The battery cell 31 is an example of the "storage portion" in the present invention.

The charge/discharge portion 32 has a DC-DC converter 33, and the DC-side bus 6 and the battery cell 31 are connected to each other through the DC-DC converter 33. In case of charge, the DC-DC converter 33 lowers the voltage of power supplied to the battery cell 31 from the voltage of the DC-side bus 6 to a voltage suitable to charge the battery cell 31 to supply the power from the DC-side bus 6 to the battery cell 31. In case of discharge, the DC-DC converter 33 raises the voltage of power discharged to the DC-side bus 6 from the voltage of the battery cell 31 to the vicinity of the voltage of the DC-side bus 6 to discharge the power from the battery cell 31 to the DC-side bus 6.

The controller 5 includes a CPU 5a and a memory 5b, and controls the DC-DC converter 33 to control charge and discharge of the battery cell 31. Specifically, the controller 5 charges/discharges the battery cell 31 to compensate for a difference between the power generated by the power generator 2 and a target output value described later on the basis of the power generated by the power generator 2 (power output from the DC-DC converter 7) and the target output value. In other words, the controller 5 controls the DC-DC converter 33 to charge the battery cell 31 with surplus power if the power generated by the power generator 2 is larger than the target output value, and controls the DC-DC converter 33 to discharge the battery cell 31 for the shortage in the power if the power generated by the power generator 2 is smaller than the target output value.

A power output detection unit 8 detecting the power generated by the power generator 2 is provided on the output side of the DC-DC converter 7. The power output detection unit 8 is an example of the "power detection portion" in the present invention. The controller 5 can acquire the power generated by the power generator 2 at each prescribed detection time interval (not more than 30 seconds, for example) on the basis of the result of detection of the power output detection unit 8. According to the first embodiment, the controller 5 acquires data on the power generated by the power generator 2 every 30 seconds. This detection time interval of the generated power must be set at an appropriate value in view of a fluctuation period or the like of the power generated by the power generator 2. According to this first embodiment, the detection time interval is so set as to be shorter than a fluctuation period capable of being dealt with by load frequency control (LFC) and shorter than standby time described later. The controller 5 can perform feedback control of charge and discharge of the charge/discharge portion 32 so that power output from the power output unit 4 becomes the target output value by acquiring the power output from the power output unit 4 and recognizing a difference between the power actually output from the power output unit 4 to the power grid 50 and the target output value.

The controller 5 is so formed as to calculate the target output value output to the power grid 50 by a method of moving average. The method of moving average is a calculation method employing an average value of the power generated by the power generator 2 in a period prior to a certain point as a target output value at the certain point, for example. A period to acquire power output data employed to calculate the target output value is hereinafter referred to as a sampling period. The sampling period is an example of the "period to acquire data on the detected power" or the "second period" in the present invention. The sampling period is between the fluctuation periods T1 to T2 dealt with by the load frequency control (LFC), in particular, preferably is of a range which is not a very long period from the vicinity of the latter half (vicinity of long periods) to more than T1. The specific value of the sampling period is at least about 10 minutes and not more than about 30 minutes in a power grid having "intensity of load fluctuation–fluctuation period" characteristics shown in FIG. 7, for example, and according to the first embodiment, the sampling period is about 10 minutes in a period other than an initial stage and a final stage of charge/discharge control, as described later. In this case, the controller 5 acquires the data on the power generated by the power generator 2 every about 30 seconds, so that the average value of twenty pieces of data on the power generated by the power generator 2 included in a period of the last 10 minutes is employed as the target output value. These upper limit period T1 and lower limit period T2 are described later in detail.

As hereinabove described, according to the first embodiment, the controller 5 calculates the target output value from the past power generated by the power generator 2 and performs the charge/discharge control in which the power generated by the power generator 2 is not directly output to the power grid 50 but the target output value is output to the power grid 50 by controlling the charge/discharge of the battery cell 31 so that the sum of the power generated by the power generator 2 and the amount of charge/discharge of the battery cell 31 is the target output value. The charge/discharge control is performed, whereby fluctuation in the power output to the power grid 50 is suppressed so that adverse effects of fluctuation in the power generated by the power generator 2 due to clouds on the power grid 50 are suppressed.

According to the first embodiment, the controller 5 does not perform charge/discharge control constantly but performs charge/discharge control only when a specific condition is met. In other words, the controller 5 does not perform charge/discharge control if adverse effects on the power grid 50 are small even if the power generated by the power generator 2 is directly output to the power grid 50, and the controller 5 performs charge/discharge control only if adverse effects on the power grid 50 are large. More specifically, the controller 5 performs charge/discharge control when the power generated by the power generator 2 is not less than a prescribed generated power (hereinafter referred to as "control initiating power output") while the amount of change in the power generated by the power generator 2 is not less than a prescribed amount of change (hereinafter referred to as the "control initiating fluctuation amount"). The control initiating power output is more than power generated when it is raining, for example, and the specific value is 10% of the rated output of the power generator 2, for example. The control initiating fluctuation amount is more than the maximum amount of change at each detection time interval in the daytime in fine weather (fine weather with almost no clouds), and the specific value is 5% of the generated power before change, for example. The amount of change in the generated power is acquired by calculating a difference between two pieces of data on the power generated by the power generator 2 sequentially detected at each prescribed detection time interval. The aforementioned specific numerical value (5% of the generated power before change and 10% of the rated output) is a numerical value corresponding to the case of the first embodiment in which the detection time interval of the generated power is about 30 seconds, and if the detection time interval is changed, the control initiating power output and the control initiating fluctuation amount must be set in response to the detection time interval.

The controller 5 starts to detect the amount of change in the power generated by the power generator 2 when the power generated by the power generator 2 changes from less than the control initiating power output to not less than the control initiating power output. Then, the controller 5 starts the charge/discharge control when the power generated by the power generator 2 changes to not less than the control initiating power output and the amount of change in the power generated by the power generator 2 changes to not less than the control initiating fluctuation amount. The controller 5 does not perform charge/discharge control if the amount of change in the power generated by the power generator 2 does not exceed the control initiating fluctuation amount even if the power generated by the power generator 2 is not less than the control initiating power output. The controller 5 stops detecting the amount of change in the power generated by the power generator 2 when the power generated by the power generator 2 changes to less than the control initiating power output while the amount of change in the power generated by the power generator 2 does not exceed the control initiating fluctuation amount.

Even if the amount of change in the power generated by the power generator 2 changes to at least the control initiating fluctuation amount, adverse effects on the power grid are small if the generated power has returned to a value in the vicinity of the generated power before change within prescribed standby time from a time point when a change of at least the amount of change to start in the generated power is detected, and hence the controller 5 does not start the charge/discharge control. The aforementioned prescribed standby time includes a period of not more than the fluctuation period capable of being dealt with by the load frequency control (LFC), and referring to a relation diagram of fluctuation period-load fluctuation line shown in FIG. 7, the prescribed standby time preferably includes a period of not more than the upper limit period T1, and more preferably includes a period of not more than the lower limit period T2. According to the first embodiment, the standby time is about not more than 2 minutes. The standby time is larger than the detection time interval and not less than twice the detection time interval (integral multiple of at least twice the detection time interval, for example). The standby time is an example of the "first period" in the present invention. A specific value in the vicinity of the generated power before change is a value between an upper threshold larger than the generated power before change by a minute amount and a lower threshold smaller than the generated power before change by a minute amount. The upper threshold is a value of 101% of the generated power before change, for example, and the lower threshold is a value of 99% of the generated power before change, for example. When a change of at least the control initiating fluctuation amount in the generated power is a decrease of at least the control initiating fluctuation amount in the generated power, the controller 5 determines that the generated power has returned to a value in the vicinity of the generated power before change if the generated power increases to at least the lower threshold (99% of the generated power before change) within the standby time after the generated power decreases. When a change of at least the control initiating fluctuation amount in the generated power is an increase of at least the control initiating fluctuation amount in the generated power, the controller 5 determines that the generated power has returned to a value in the vicinity of the generated power before change if the generated power decreases to not more than the upper threshold (101% of the generated power before change) within the standby time after the generated power increases. In other words, the thresholds serving as a benchmark for determination on whether or not the generated power has returned to a value in the vicinity of the generated power before change are different from each other in cases where the change of at least the control initiating fluctuation amount in the generated power is an increase, and the change of at least the control initiating fluctuation amount in the generated power is a decrease. The upper threshold and the lower threshold are examples of the "first threshold" and the "second threshold" in the present invention, respectively.

Figure 2:
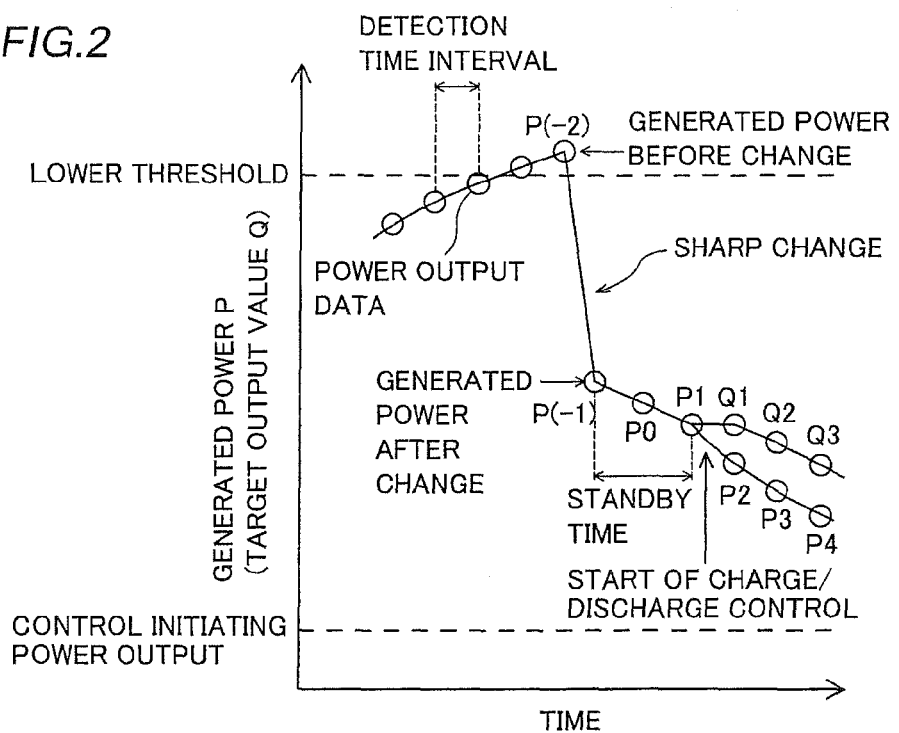
FIG. 2 is a diagram for illustrating a transition of generated power at the start of the charge/discharge control of the power generation system according to the first embodiment shown in FIG. 1 and a target output value (example of starting the charge/discharge control after sharp decrease in the generated power).
Figure 3:
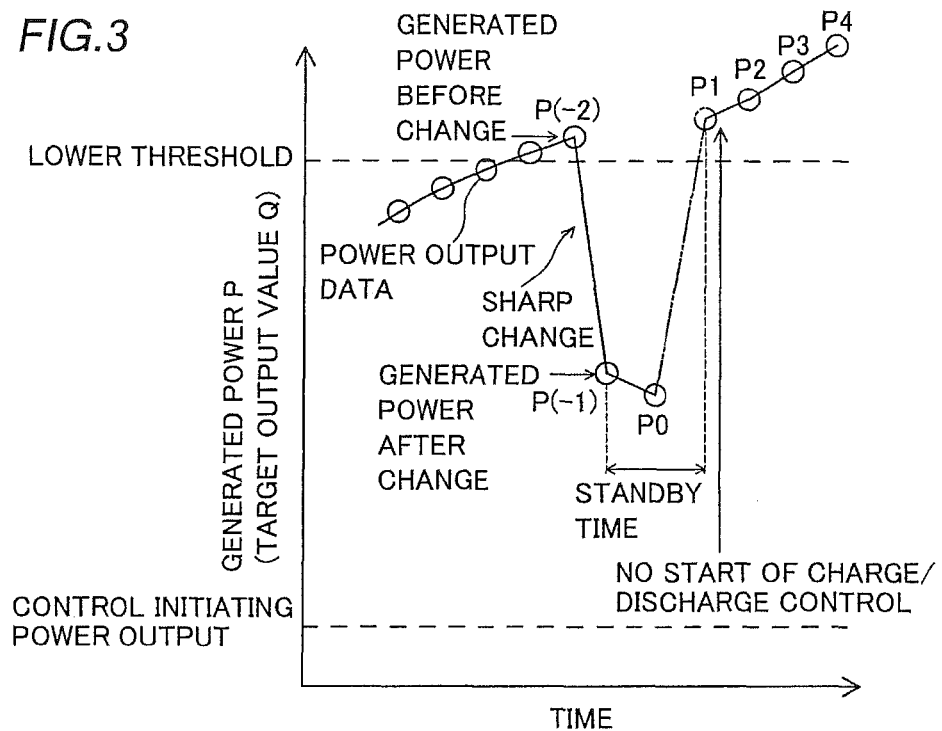
FIG. 3 is a diagram for illustrating a transition of the generated power at the start of the charge/discharge control of the power generation system according to the first embodiment shown in FIG. 1 (example of not starting the charge/discharge control after sharp decrease in the generated power).

The aforementioned points are described with reference to FIGS. 2 to 5. As shown in FIG. 2, when the generated power sharply falls from generated power P (−2) to generated power P (−1), the controller 5 starts the charge/discharge control if the generated power does not return (rise) to a value in the vicinity of the generated power P (−2) within the standby time from a time point when the generated power P (−1) is detected. In an example shown in FIG. 2, the standby time is 1 minute. In this example, generated power P0 and generated power P1 each detected within the 1-minute standby time from the time point when the generated power P (−1) is detected remain below the lower threshold. In this case, the controller 5 determines that the generated power has not returned to the vicinity of the generated power before change (generated power P (−2)) within the standby time and starts the charge/discharge control at a time point when the generated power P1 is detected (time point when the standby time is terminated). In an example shown in FIG. 3, the generated power P0 detected within the 1-minute standby time from the time point when the generated power P (−1) is detected is below the lower threshold, whereas the generated power P1 detected within the 1-minute standby time from the time point when the generated power P (−1) is detected rises to at least the lower threshold. In this case, the controller 5 determines that the generated power has returned to the vicinity of the generated power before change (generated power P (−2)) within the standby time and does not start the charge/discharge control after the standby time elapses.

Figure 4:
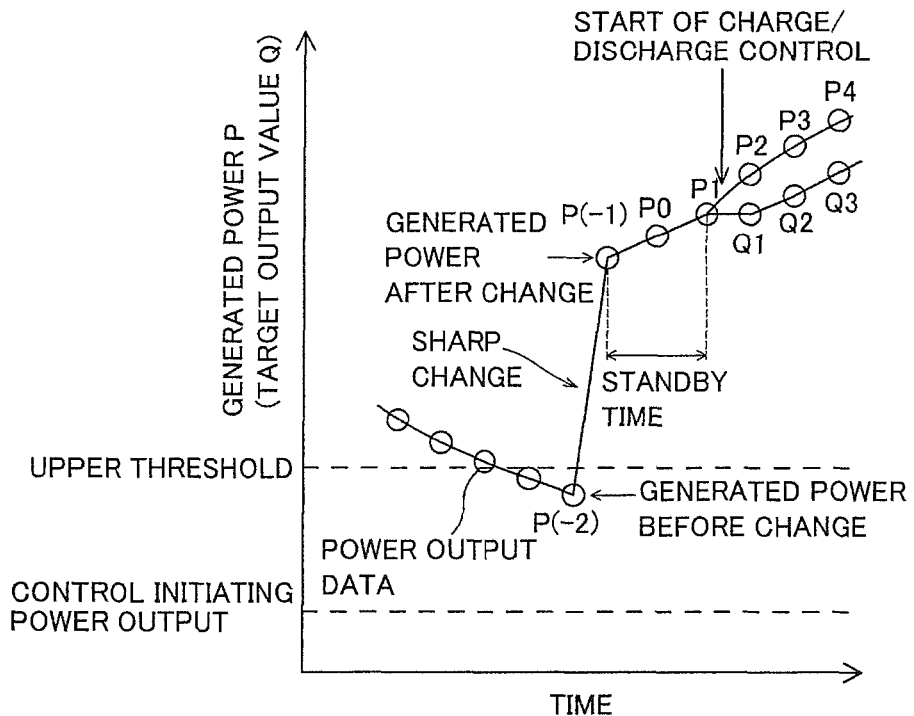
FIG. 4 is a diagram for illustrating a transition of the generated power at the start of the charge/discharge control of the power generation system according to the first embodiment shown in FIG. 1 and the target output value (example of starting the charge/discharge control after sharp increase in the generated power).
Figure 5:
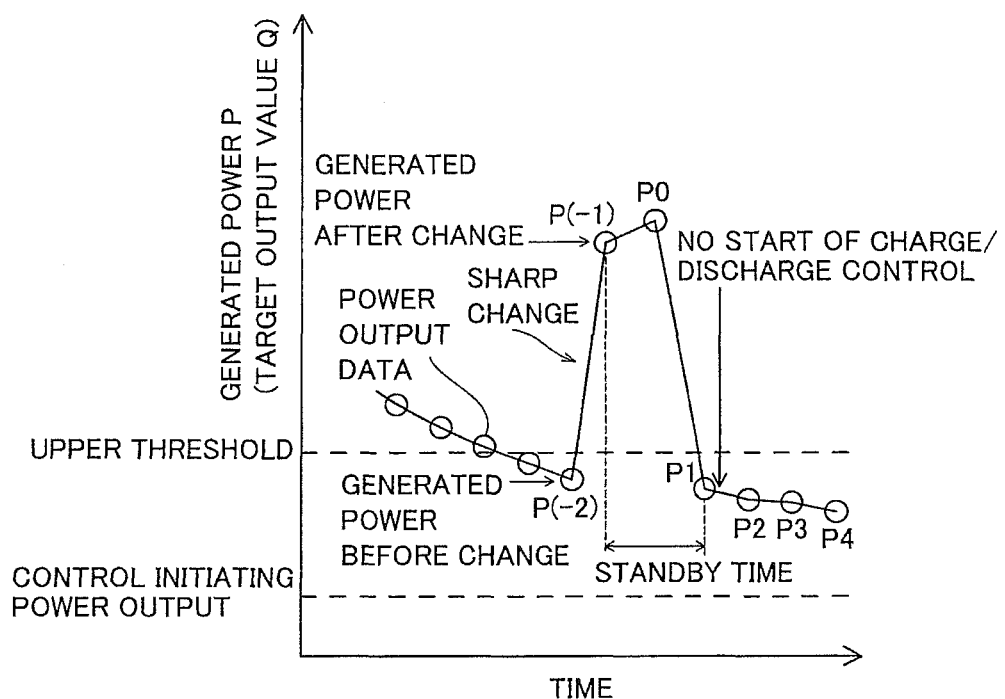
FIG. 5 is a diagram for illustrating a transition of the generated power at the start of the charge/discharge control of the power generation system according to the first embodiment shown in FIG. 1 (example of not starting the charge/discharge control after sharp increase in the generated power).

As shown in FIG. 4, when the generated power sharply rises from the generated power P (−2) to the generated power P (−1), the controller 5 starts the charge/discharge control if the generated power does not return (fall) to a value in the vicinity of the generated power P (−2) within the standby time from the time point when the generated power P (−1) is detected. In an example shown in FIG. 4, the generated power P0 and generated power P1 each detected within the 1-minute standby time from the time point when the generated power P (−1) is detected remain above the upper threshold. In this case, the controller 5 determines that the generated power has not returned to the vicinity of the generated power before change (generated power P (−2)) within the standby time and starts the charge/discharge control at the time point when the generated power P1 is detected (time point when the standby time is terminated). In an example shown in FIG. 5, the generated power P0 detected within the 1-minute standby time from the time point when the generated power P (−1) is detected is above the upper threshold, whereas the generated power P1 detected within the 1-minute standby time from the time point when the generated power P (−1) is detected falls to not more than the upper threshold. In this case, the controller 5 determines that the generated power has returned to the vicinity of the generated power before change (generated power P (−2)) within the standby time and does not start the charge/discharge control after the standby time elapses.

The generated power P (−2) before change and the generated power P (−1) after change in FIGS. 2 to 5 are examples of the "first power (first generated power)" and the "second power (second generated power)" in the present invention, respectively.

The controller 5 is so formed as to stop the charge/discharge control after the same starts the charge/discharge control and a certain control period elapses. The control period is an example of the "third period" in the present invention. The control period is set to be at least the sampling period determined on the basis of the fluctuation period range dealt with by the load frequency control, and in a case where a method in which the period to acquire power output data is shortened at the initial stage and the final stage of the charge/discharge control is employed, the minimum control period is obtained by at least adding a period to shorten the period to acquire data to the sampling period. If the control period is too short, the effect of suppressing the fluctuation period range dealt with by the load frequency control is deteriorated, and if the control period is too long, the charging/discharging count increases so that the lifetime of the battery cell tends to decrease, and an appropriate period must be set. According to the first embodiment, the control period is set at 30 minutes. If a change of at least the control initiating fluctuation amount in the generated power is detected a prescribed number of times (three times in the first embodiment) in the control period, the controller 5 extends the control period. This extension is implemented by newly setting a 30-minute control period at a time point when a third change in the generated power is detected. If the control period is extended, the controller 5 stops the charge/discharge control after 30 minutes from the time point when the third change in the generated power is detected (time point when the extension starts) in a case where a change of at least the control initiating fluctuation amount in the generated power is not newly detected three times from the time point when the third change in the generated power is detected (time point when the extension starts). In a case where a change of at least the control initiating fluctuation amount in the generated power is newly detected three times from the time point when the third change in the generated power is detected (time point when the extension starts), 30-minute extension is implemented again.

The controller 5 is so formed as to stop the charge/discharge control even before the control period elapses if the power generated by the power generator 2 falls below generated power to terminate control in the control period. The generated power to terminate control is not more than the control initiating power output and a half of the control initiating power output in the first embodiment.

Next, a method for calculating the target output value by the controller 5 of the photovoltaic power generation system 1 according to the first embodiment of the present invention is described with reference to FIGS. 2 to 6. It is assumed that the generated power changes as shown in FIG. 2. Specifically, an example in which the generated power gradually rises and sharply changes (falls) from generated power detection timing (generated power P (−2)) to subsequent generated power detection timing (generated power P (−1)), and thereafter the amount of change in the generated power does not return to a value in the vicinity of the generated power before change (generated power P (−2)) in the standby time and the generated power gradually falls is assumed. FIG. 2 shows the example in which the generated power sharply falls, but also in a case where the generated power sharply rises, a method for calculating the target output value is similar to the method for calculating the target output value described below.

Figure 6:
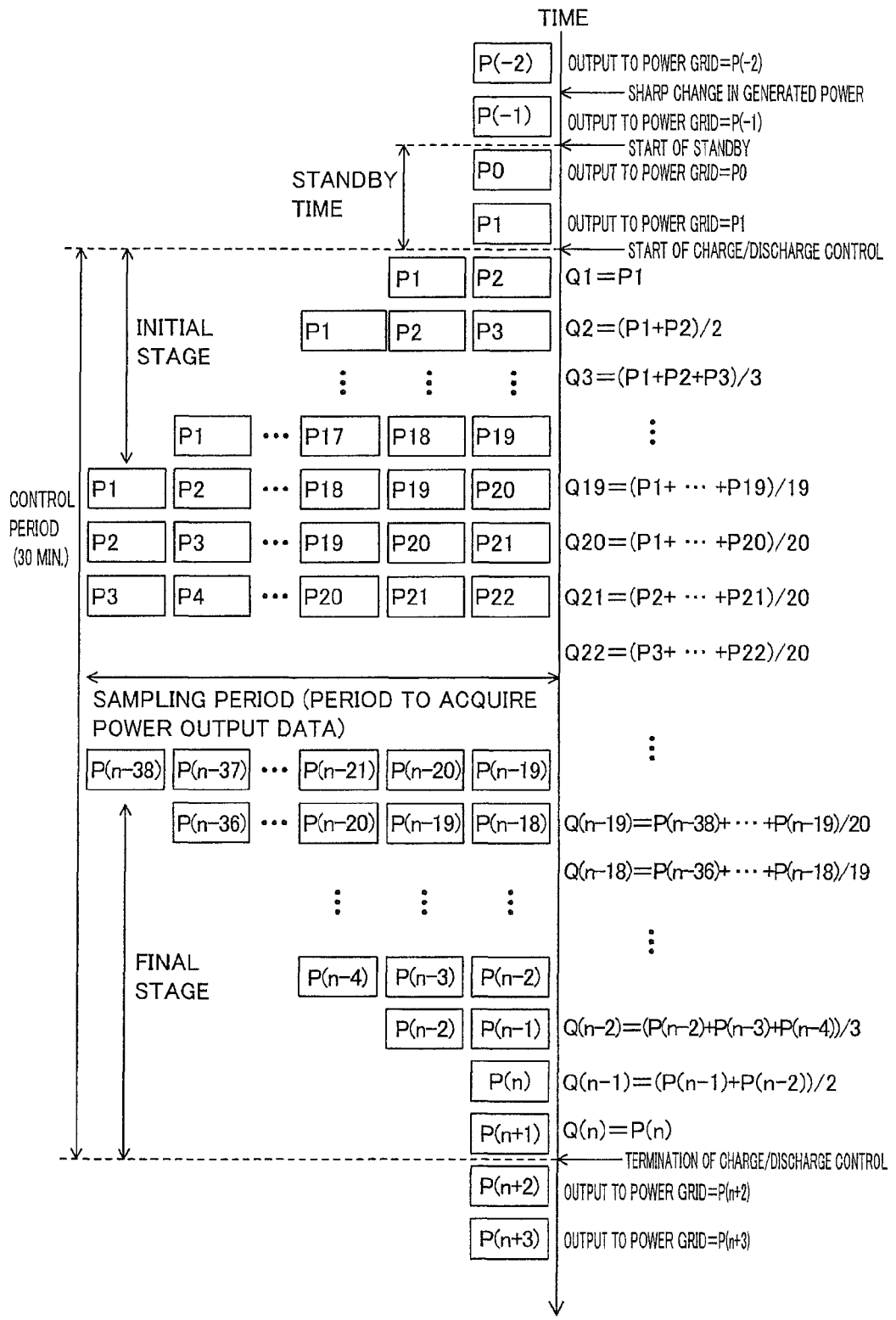
FIG. 6 is a diagram for illustrating a period to acquire power output data to calculate the target output value at the charge/discharge control of the power generation system according to the first embodiment shown in FIG. 1.

If the generated power sharply changes as shown in FIG. 2, the controller 5 calculates the average value of twenty pieces of power output data included in the last 10-minute sampling period as the target output value in the period other than the initial state and the final stage of the charge/discharge control, as shown in FIG. 6. On the other hand, the controller 5 is so formed as to calculate the target output value from power output data in a period shorter than the sampling period (10 minutes, twenty pieces of power output data) of the power output data in a period other than the initial stage and the final stage of the charge/discharge control, in respect to the initial stage (10 minutes from the start of the charge/discharge control) and the final stage (10 minutes until the planned termination of the charge/discharge control) of the charge/discharge control.

Specifically, in the initial stage of the charge/discharge control, the controller 5 successively accumulates power output data (P1, P2 . . . ) after start of the charge/discharge control in the memory 5b and gradually increases the sampling period of the power output data in response to the number of pieces of power output data having been accumulated since the start of the charge/discharge control. In other words, in a case where a large difference is produced between the generated power P (−2) at the generated power detection timing and the generated power P (−1) at the subsequent generated power detection timing, and the controller 5 recognizes that the generated power does not returns to the vicinity of the generated power P (−2) in the standby time to start the charge/discharge control, a first target output value Q1 after the start of the charge/discharge control is power output data P1 previously acquired itself, and a second target output value Q2 is the average of two pieces of power output data (two pieces of the last power output data P1 and P2) having been accumulated in the memory 5b, as shown in FIG. 6. A third target output value Q3 is the average of three pieces of power output data (three pieces of the last power output data P1, P2, and P3) having been accumulated in the memory 5b.

Similarly, a twentieth target output value Q20 is the average of twenty pieces of the last power output data (P1 to P20) having been accumulated in the memory 5b. The charge/discharge control shifts from the initial stage to the period other than the initial stage and the final stage at a time point when the number of pieces of the accumulated power output data reaches twenty. After the number of pieces of the accumulated power output data reaches twenty (in the period other than the initial stage and the final stage), the controller 5 calculates the target output value on the basis of the twenty pieces of power output data.

When a time point when the charge/discharge control is terminated (time point when the charge/discharge control is planned to be terminated) approaches, the controller 5 gradually decreases the sampling period of the power output data in response to the number of pieces of power output data planned to be acquired until the time point when the charge/discharge control is terminated (time point when the charge/discharge control is planned to be terminated). The time point when the charge/discharge control is planned to be terminated is 30 minutes after the start of the charge/discharge control (start of the extension), and hence a time point when the controller 5 starts to decrease the sampling period of the power output data can be calculated. In other words, when it is 10 minutes prior to the time point when the charge/discharge control is planned to be terminated, the charge/discharge control shifts from the period other than the initial stage and the final stage to the final stage, and the controller 5 starts to decrease the sampling period of the power output data from a time point when the final stage starts.

Specifically, assuming that calculation of a target output value at the time point when the charge/discharge control is terminated (time point when the charge/discharge control is planned to be terminated) is n-th time from the start of the control, a twentieth target output value Q (n−19) prior to termination of the control is the average of twenty pieces of the last power output data P (n−38) to P (n−19). A nineteenth target output value Q (n−18) prior to the termination of the control is the average of nineteen pieces of the last power output data P (n−36) to P (n−18). Similarly, a third target output value Q (n−2) prior to the termination of the control is the average of three pieces of the last power output data P (n−4), P (n−3), and P (n−2). A second target output value Q (n−1) prior to the termination of the control is the average of two pieces of the last power output data P (n−2) and P (n−1). A target output value Q (n) immediately prior to the termination of the control is the preceding power output data P (n) itself.

Figure 7:
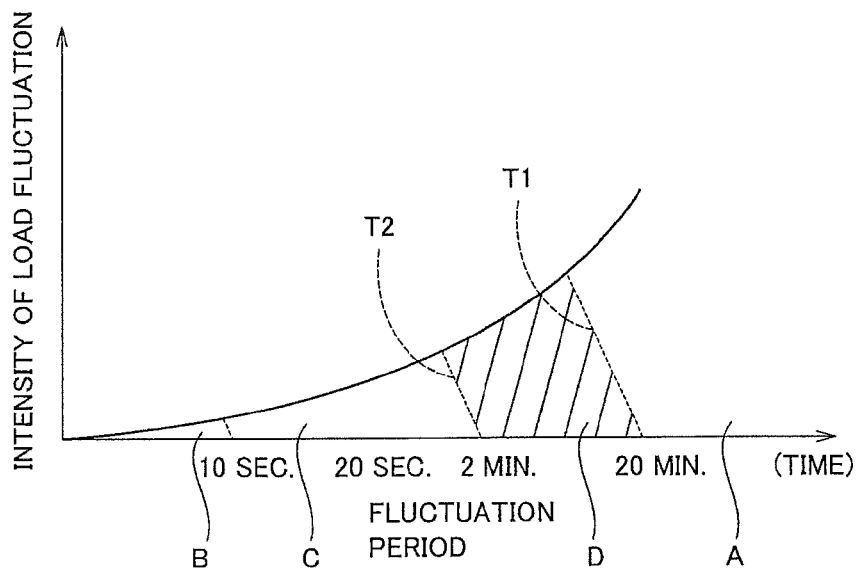
FIG. 7 is a diagram for illustrating a relation between the intensity of load fluctuation with respect to a power grid and a fluctuation period.

A fluctuation period range according to the first embodiment in which fluctuation is suppressed mainly by the charge/discharge control is described. As shown in FIG. 7, the enabled control method varies with the fluctuation period, and the fluctuation period capable of being dealt with by the load frequency control (LFC) is shown as a region D (region shown by hatching). Furthermore, the fluctuation period capable of being dealt with by EDC is shown as a region A. A region B is a region where the power grid 50 spontaneously absorbs the influence of load fluctuation or the like by its self-regulating characteristics. A region C is a region capable of being dealt with by the governor-free operation of power generators in each generating station. A boundary line between the region D and the region A is the upper limit period T1 of the fluctuation period capable of being dealt with by the load frequency control (LFC), and a boundary line between the region C and the region D is the lower limit period T2 of the fluctuation period capable of being dealt with by the load frequency control (LFC). These upper and lower limit periods T1 and T2 are not limited to periods shown in FIG. 7, but the same are numerical values varied by the intensity of the load fluctuation or the like. Also, time of the fluctuation period shown by an established power network is varied. The first embodiment focuses on fluctuation having a fluctuation period (fluctuation frequency) included within the region D (region capable of being dealt with by the LFC) incapable of being dealt with by the EDC, the self-regulating characteristics of the power grid 50 itself, the governor-free operation, etc., and is aimed at suppression of the fluctuation.

Figure 8:
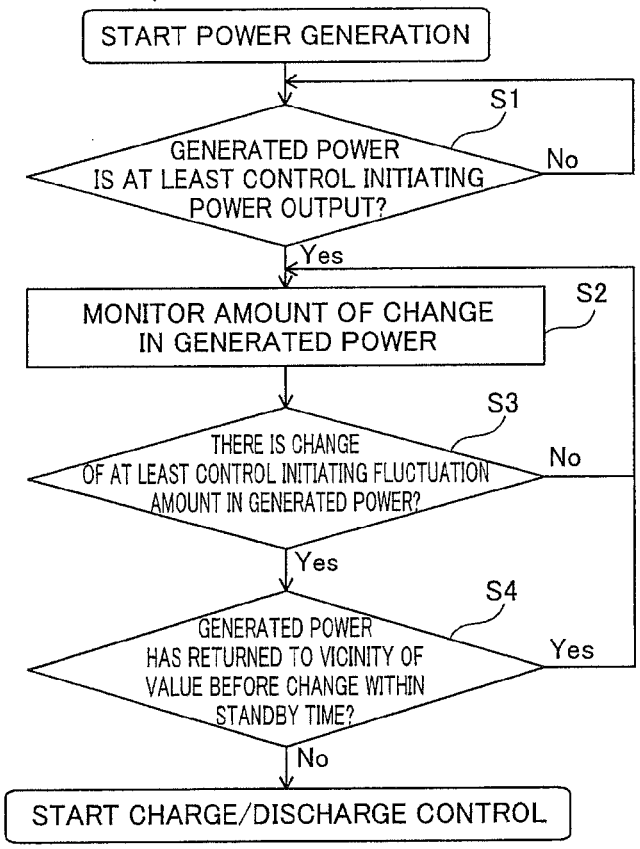
FIG. 8 is a flowchart for illustrating the control flow of the power generation system according to the first embodiment shown in FIG. 1 prior to the start of the charge/discharge control.

Next, a control flow of the photovoltaic power generation system 1 according to the first embodiment of the present invention prior to the start of the charge/discharge control is described with reference to FIG. 8.

The controller 5 detects the power generated by the power generator 2 at each prescribed detection time interval (every 30 seconds). At a step S1, the controller 5 determines whether or not the generated power has become at least the control initiating power output. If the generated power has not become at least the control initiating power output, this determination is repeated. If the generated power has become at least the control initiating power output, the controller 5 starts to monitor the amount of change in the generated power at a step S2. In other words, a difference between the detection values of detected generated power and preceding generated power is acquired as the amount of change in the generated power.

At a step S3, the controller 5 determines whether or not there is a change of at least the control initiating fluctuation amount in the generated power. If there is no change of at least the control initiating fluctuation amount in the generated power, the controller 5 returns to the step S2 and continues to monitor the amount of change in the generated power.

If there is a change of at least the control initiating fluctuation amount in the generated power, the controller 5 determines whether or not the generated power has returned to the vicinity of a value before change within the standby time at a step S4. If the generated power has returned to the vicinity of the value before change, the controller 5 does not perform the charge/discharge control but returns to the step S2, and continues to monitor the amount of change in the generated power. If the generated power has not returned to the vicinity of the value before change, the controller 5 starts the charge/discharge control. Although it is not illustrated in FIG. 8, the controller 5 is so formed as to confirm the absolute value of the generated power when monitoring the amount of change in the generated power at the step S2, for example, and return to the step S1 if the generated power falls below the control initiating power output or the generated power to terminate control.

Figure 9:
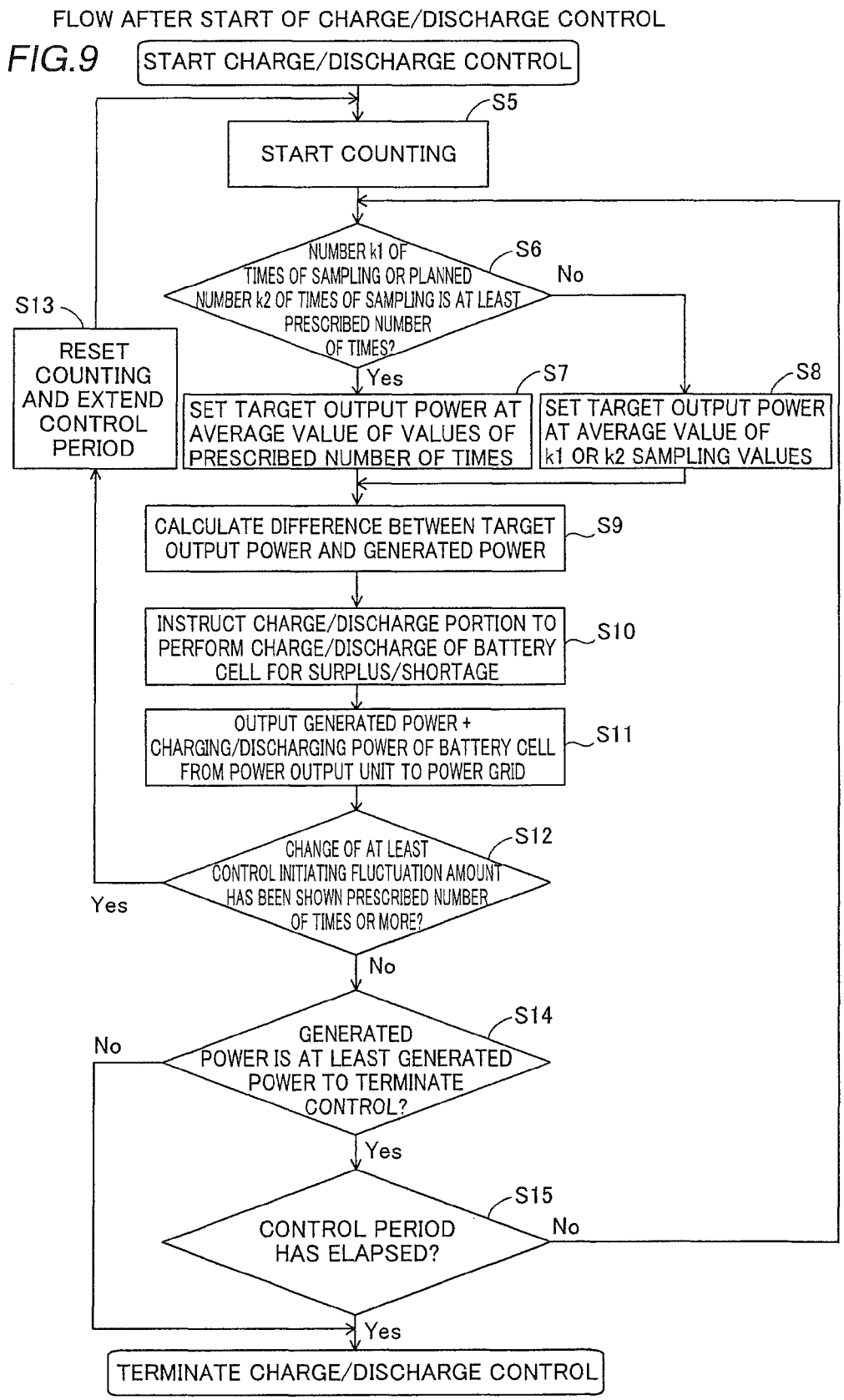
FIG. 9 is a flowchart for illustrating the control flow of the power generation system according to the first embodiment shown in FIG. 1 after the start of the charge/discharge control.

Next, a control flow after the start of the charge/discharge control is described in detail with reference to FIG. 9.

After the start of the charge/discharge control, the controller 5 starts to count elapsed time from the time point when the charge/discharge control starts at a step S5.

Then, the controller 5 determines whether or not the number (number k1 of times of sampling) of pieces of power output data having been accumulated since the start of the charge/discharge control or a planned number k2 of times of sampling until the planned termination of the charge/discharge control is at least a prescribed number of times (twenty times in the first embodiment) at a step S6.

If the number k1 of times of sampling of the power output data or the planned number k2 of times of sampling until the termination is at least twenty times, the controller 5 calculates the target output value by the method of moving average with preceding twenty sampling values to set the same at a step S7.

If the number k1 of times of sampling of the power output data or the planned number k2 of times of sampling until the termination of the control is less than the prescribed number of times (twenty times), the controller 5 calculates the target output value by the method of moving average with k1 or k2 sampling values to set the same at a step S8. In other words, the number of times of sampling employed to calculate the target output value is increased one by one from one to twenty each time the target output value is calculated at the start of the charge/discharge control, and the number of times of sampling employed to calculate the target output value is decreased one by one from twenty to one each time the target output value is calculated at the (planned) termination of the charge/discharge control.

Then, the controller 5 calculates a difference between the target output value set at the step S7 or the step S8 and the generated power detected after the calculation of the target output value at a step S9. At a step S10, the controller 5 instructs the charge/discharge portion 32 to charge/discharge the battery cell 31 for the surplus/shortage. In other words, the controller 5 so instructs the DC-DC converter 33 to discharge that the shortage of the power generated by the power generator 2 with respect to the target output value is supplemented by the battery cell 31 when the target output value is larger than the generated power. Furthermore, the controller 5 instructs the DC-DC converter 33 to charge the battery cell 31 with the surplus obtained by subtracting the target output value from the power generated by the power generator 2 when the target output value is smaller than the generated power.

Then, the target output value (power generated by the power generator 2+charging/discharging power of the battery cell 31) is output from the power output unit 4 to the power grid 50 at a step S11.

Thereafter, the controller 5 determines whether or not a change of at least a prescribed amount of change (control initiating fluctuation amount) in the generated power has been generated a prescribed number of times (three times in the first embodiment) in the control period (30 minutes) at a step S12. If the change of at least the control initiating fluctuation amount in the generated power has been generated three times, the change in the generated power is more likely to continue even after this. Thus, the counting of the elapse time is reset while the period of the charge/discharge control is extended at a step S13. In this case, the controller 5 returns to the step S5, and starts the counting of elapse time again.

If the change of at least the control initiating fluctuation amount in the generated power has been generated twice or less, the controller 5 determines whether or not the power generated by the power generator 2 is at least prescribed generated power (generated power to terminate control) at a step S14. Then, if the power generated by the power generator 2 is at least the generated power to terminate control, the controller 5 determine whether or not the control period (30 minutes) has elapsed since the charge/discharge control started or the charge/discharge control period was extended at a step S15. If the control period has elapsed, the controller 5 terminates the charge/discharge control. If the control period has not elapsed, the controller 5 returns to the step S6, and continues the charge/discharge control.

If determining that the generated power is less than the generated power to terminate control at the step S14, the controller 5 terminates the charge/discharge control even if the control period has not elapsed.

According to the first embodiment, as hereinabove described, the controller 5 is so formed as to control the battery cell 31 to carrying out charge/discharge if the amount of change in the power generated by the power generator 2 is at least the control initiating fluctuation amount, whereby no charge/discharge control is performed if the amount of change in the power generated by the power generator 2 is smaller than the control initiating fluctuation amount, and hence the charging/discharging count of the battery cell 31 can be reduced. Furthermore, the controller 5 is so formed as to perform the charge/discharge control if the generated power does not return to the vicinity of the generated power before change within the standby time from a time point when the generated power is changed by at least the control initiating fluctuation amount, whereby the controller 5 does not perform the charge/discharge control if the generated power returns to the vicinity of the generated power before change within the standby time, even if the amount of change in the power generated by the power generator 2 is at least the control initiating fluctuation amount, and hence the charging/discharging count of the battery cell 31 can be further reduced. Thus, the lifetime of the battery cell 31 can be increased. Furthermore, the inventor has found as a result of a deep study that effects of fluctuation in the power generated by the power generator 2 on the power grid 50 are small even when the controller 5 does not perform the charge/discharge control, if the generated power returns to the vicinity of the generated power before change within the standby time even if the amount of change in the generated power is smaller or larger than the control initiating fluctuation amount, as described below. Therefore, according to the first embodiment, the lifetime of the battery cell 31 can be increased while effects of fluctuation in the power generated by the power generator 2 on the power grid 50 are suppressed.

According to the first embodiment, as hereinabove described, the controller 5 is so formed as to determine that the generated power does not return to the vicinity of the generated power before change if the generated power does not reach the threshold (lower threshold or upper threshold) including the value in the vicinity of the generated power before change within the standby time from the time point when the generated power is changed by at least the control initiating fluctuation amount. According to this structure, the controller 5 can easily determine whether or not the generated power has returned to the vicinity of the generated power before change, employing the threshold (lower threshold or upper threshold) set in the vicinity of the generated power before change.

According to the first embodiment, as hereinabove described, the controller 5 determines that the generated power does not return to the vicinity of the generated power before change if the change of at least the control initiating fluctuation amount in the generated power is directed in a direction in which the generated power increases, and the generated power does not fall to the upper threshold or below within the standby time. Furthermore, the controller 5 determines that the generated power does not return to the vicinity of the generated power before change if the change of at least the control initiating fluctuation amount in the generated power is directed in a direction in which the generated power decreases, and the generated power does not rise to at least the lower threshold within the standby time. According to this structure, the controller 5 can easily determine whether or not the generated power has returned to generated power slightly larger than the generated power before change by determining whether or not the generated power is larger than the generated power before change and falls below the upper threshold in the vicinity of the generated power before change, if the change of at least the control initiating fluctuation amount in the generated power is directed in the direction in which the generated power increases. On the other hand, the controller 5 can easily determine whether or not the generated power has returned to generated power slightly larger than the generated power before change by determining whether or not the generated power is smaller than the generated power before change and exceeds the lower threshold in the vicinity of the generated power before change, if the change of at least the control initiating fluctuation amount in the generated power is directed in the direction in which the generated power decreases.

According to the first embodiment, as hereinabove described, the controller 5 determines whether or not the generated power has returned to the generated power in the vicinity of the generated power before change within the standby time larger than the detection time interval, whereby the standby time to determine whether or not the generated power has returned to the vicinity of the generated power before change is set at a period larger than the detection time interval so that the controller 5 does not determine that the generated power has returned to the generated power before change within the standby time to perform the charge/discharge control, even if the generated power relatively slowly returns to the generated power before change over a period longer than the detection time interval of the generated power. Thus, the charging/discharging count of the battery cell 31 can be reduced, and hence the lifetime of the battery cell 31 can be increased.

According to the first embodiment, as hereinabove described, the standby time is set to be equal to the integral multiple of at least twice the detection time interval. According to this structure, the generated power may not be detected separately at timing other than the detection time interval to determine whether or not the generated power has returned to the vicinity of the generated power before change within the standby time, but the controller 5 can easily determine whether or not the generated power has returned to the vicinity of the generated power before change within the standby time by detecting the generated power at timing of the detection time interval.

According to the first embodiment, as hereinabove described, the standby time is set to be not more than the fluctuation period capable of being dealt with by the load frequency control (LFC). According to this structure, effects generated by providing the standby time, corresponding to the fluctuation period can be suppressed at least in the fluctuation period range capable of being dealt with by the load frequency control. Thus, the charging/discharging count of the battery cell 31 can be effectively reduced while fluctuation in the fluctuation period capable of being dealt with by the load frequency control is suppressed.

According to the first embodiment, as hereinabove described, the sampling period of the power output data employed to calculate a moving average in the initial stage of the charge/discharge control is rendered shorter than the sampling period in the period other than the initial stage and the final stage of the charge/discharge control in order to calculate the target output value. According to this structure, when the sharp change of at least the control initiating fluctuation amount in the generated power occurs to start the charge/discharge control, and the target output value at the time point when the charge/discharge control starts is calculated, the sampling period of the power output data is set to be short so that the value of the generated power before the sharp change (before the start of the charge/discharge control) greatly different from the generated power at the time point when the charge/discharge control starts can be inhibited from being employed to calculate the target output value. Thus, a difference between the target output value calculated at the start of the charge/discharge control and the actually generated power can be reduced, and hence a change in power output to the power grid 50 between before and after the start of the charge/discharge can be reduced while the amount of charge/discharge of the battery cell 31 to supplement the difference can be reduced. Consequently, fluctuation in the amount of power output from the power output unit 4 to the power grid 50 can be suppressed, and hence the adverse effects on the power grid 50 can be suppressed while the storage capacity of the battery cell 31 can be reduced.

According to the first embodiment, as hereinabove described, the sampling period of the power output data employed to calculate a moving average in the final stage of the charge/discharge control is rendered shorter than the sampling period in the period other than the initial stage and the final stage of the charge/discharge control, whereby only the power output data in the vicinity of the time point when the charge/discharge control is terminated is acquired to calculate the target output value at the time point when the charge/discharge control is terminated, and hence a difference between the target output value calculated at the termination of the charge/discharge control and the actually generated power can be reduced. Thus, a change in power output to the power grid 50 between before and after the termination of the charge/discharge control can be reduced. Consequently, the fluctuation in the amount of power output from the power output unit 4 to the power grid 50 can be suppressed, and hence the adverse effects on the power grid 50 can be suppressed.

According to the first embodiment, as hereinabove described, a period to acquire the power output data employed in a moving average is gradually increased in response to the amount of power output data having been accumulated since the start of the charge/discharge control from the initial stage of the charge/discharge control to the period other than the initial stage and the final stage of the charge/discharge control in order to calculate the target output value. According to this structure, the sampling period of the power output data employed in a moving average is gradually increased in response to the amount (accumulation period) of power output data having been accumulated since the start of the charge/discharge control, whereby the increasing power output data gradually accumulated after the start of the charge/discharge control can be properly acquired in response to the amount of accumulation (accumulation period) to calculate the target output value, and hence the target output value after the initial stage of the charge/discharge control can be set at a value along an actually generated power transition. Thus, the fluctuation in the amount of power output from the power output unit 4 to the power grid 50 can be suppressed, and hence the adverse effects on the power grid 50 can be suppressed while the storage capacity of the battery cell 31 can be reduced.

According to the first embodiment, as hereinabove described, the sampling period of the power output data employed in the moving average is gradually decreased from the period other than the initial stage and the final stage of the charge/discharge control to the final stage to calculate the target output value. According to this structure, the sampling period of the power output data employed to calculate the moving average in the final stage of the charge/discharge control can be gradually shortened from the period other than the initial stage and the final stage of the charge/discharge control, and hence a difference between the target output value and the actually generated power can be gradually reduced toward the termination of the charge/discharge control. Thus, a difference between the target output value immediately before the termination of the charge/discharge control and the actually generated power immediately after the termination of the charge/discharge control can be inhibited from increase, and hence the change in power output to the power grid 50 between before and after the termination of the charge/discharge control can be further reduced. Thus, the fluctuation in the amount of power output from the power output unit 4 to the power grid 50 can be further suppressed, and hence the adverse effects on the power grid 50 can be further suppressed.

According to the first embodiment, as hereinabove described, when the charge/discharge control of the battery cell 31 is performed, the power output data is acquired employing the period T not less than the lower limit period T2 of the fluctuation period capable of being dealt with by the load frequency control (LFC) and preferably not less than the upper limit period T1 as the sampling period of the power output data to calculate the target output value by the method of moving average. According to this structure, the charge/discharge of the battery cell 31 is controlled with the target output value calculated employing T obtained by considering the fluctuation period capable of being dealt with by the load frequency control as the sampling period, whereby the components of the fluctuation period dealt with by the load frequency control (LFC) can be reduced. Thus, effects on the power grid 50 can be suppressed.

According to the first embodiment, as hereinabove described, the charge/discharge control is terminated after the elapse of the prescribed control period from the start of the charge/discharge control. According to this structure, the charge/discharge control is performed only for a certain period, whereby the charging/discharging count can be reduced as compared with a case where the charge/discharge control is not terminated. Thus, the lifetime of the battery cell 31 can be increased. Furthermore, the termination of the charge/discharge control can be time-controlled, and hence control algorithm can be simplified.

According to the first embodiment, as hereinabove described, the control period of the charge/discharge control is extended if the change of at least the control initiating fluctuation amount in the generated power is generated a prescribed number of times in the charge/discharge control. According to this structure, the charge/discharge control can continue to be performed if fluctuation in the generated power is expected to continue, whereas the charge/discharge control can be inhibited in a period when the fluctuation in the generated power does not continue, and the charge/discharge control is considered unnecessary. Consequently, the charge/discharge control can be effectively performed while the charging/discharging count of the battery cell 31 is reduced.

According to the first embodiment, as hereinabove described, the charge/discharge control is performed if the amount of change in the generated power is at least the maximum amount of change at each detection time interval in the daytime in fine weather, for example. According to this structure, in fine weather in which the amount of change in the generated power at each detection time interval is small, adverse effects on the power grid 50 are small even if no charge/discharge control is performed. Thus, no charge/discharge control is performed in fine weather, whereby the charging/discharging count can be reduced while effects of fluctuation in the power generated by the power generator 2 on the power grid 50 is suppressed. Consequently, the lifetime of the battery cell 31 can be increased.

According to the first embodiment, as hereinabove described, the charge/discharge control is performed if the amount of change in the generated power is at least 5% of the generated power before change. According to this structure, the control initiating fluctuation amount that is the threshold at the start of the charge/discharge control can be rendered larger than the amount of change in the generated power in fine weather, and hence the charge/discharge control can be easily prevented in fine weather. The control initiating fluctuation amount may be obtained based on the rating capacity of the power generator 2. Also in this way, effects similar to the aforementioned effects can be obtained.

According to the first embodiment, as hereinabove described, the charge/discharge portion 32 is controlled on the basis of the power of the prescribed DC voltage obtained by conversion of the DC voltage by the DC-DC converter 7 and the target output value output to the power grid 50. According to this structure, fluctuation in the voltage of the DC-side bus 6 depending on the amount of insolation or the like can be suppressed, and hence the voltage of the DC-side bus 6 can be kept substantially constant. A difference between the voltages of the battery cell 31 and the DC-side bus 6 is important to control the amount of charge/discharge, and the voltage of the DC-side bus 6 is kept substantially constant, whereby the amount of charge/discharge can be controlled simply by controlling the voltage of the battery cell 31. Thus, the controllability of the controller 5 can be improved.

Next, results of a deep study of the effects obtained by employing the photovoltaic power generation system 1 according to the first embodiment of the present invention are described in detail with reference to FIGS. 10 to 16.

Figure 10:
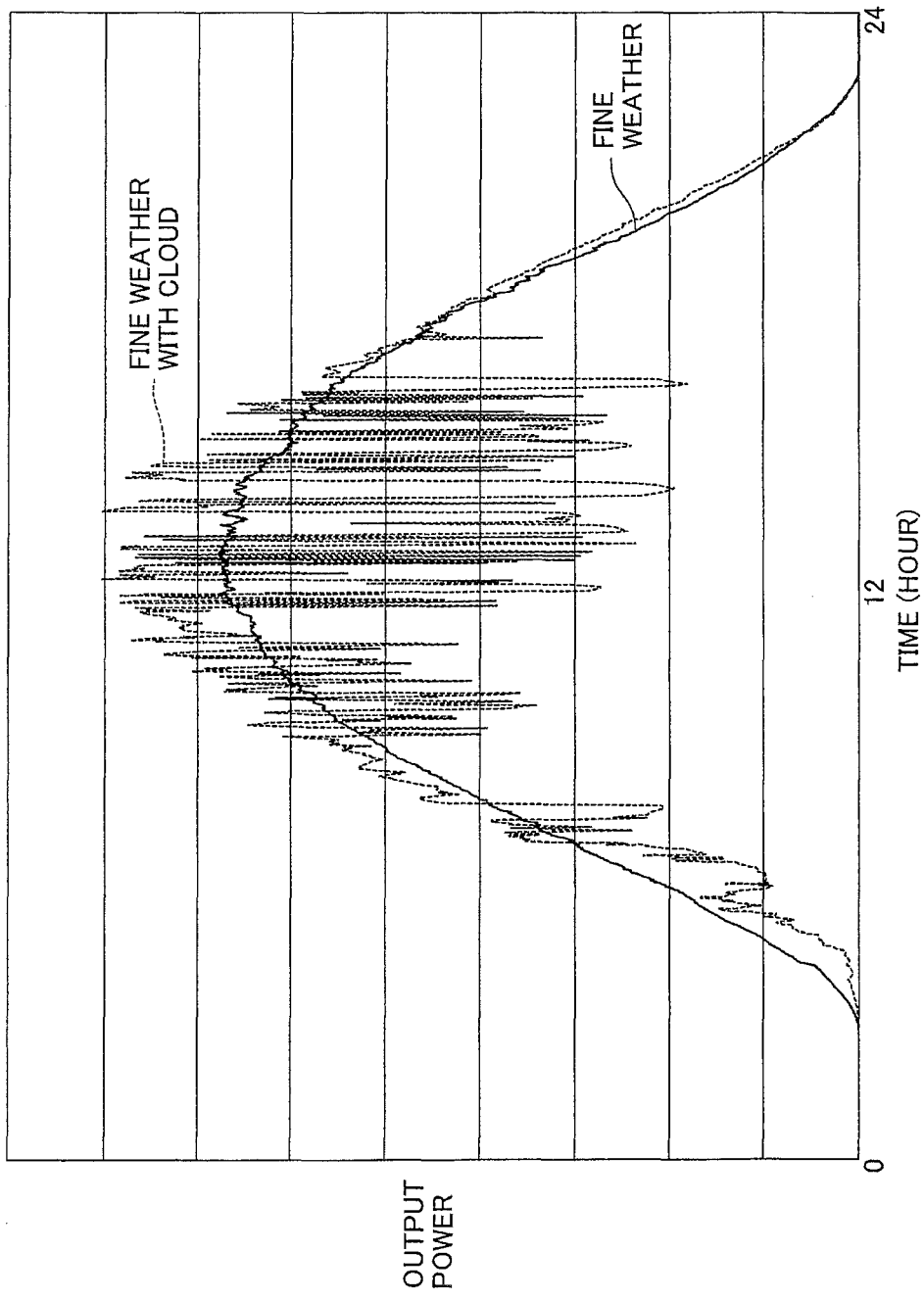
FIG. 10 is a graph showing one-day transitions of power output to the power grid in fine weather and fine weather with clouds (no charge/discharge control).

FIG. 10 shows fluctuation transitions of power (output power) actually generated per day in fine weather and fine weather with clouds. FIG. 10 shows power (power generated by the power generator 2) output to the power grid 50 in a case where no charge/discharge control is performed.

As shown in FIG. 10, it is understood that sunlight is not blocked by clouds in fine weather so that the power generated by the power generator 2 smoothly fluctuates without large fluctuation. On the other hand, it is understood that the amount of insolation fluctuates due to the clouds in fine weather with clouds so that the power generated by the power generator 2 repetitively greatly fluctuates, as shown in FIG. 10.

Figure 11:
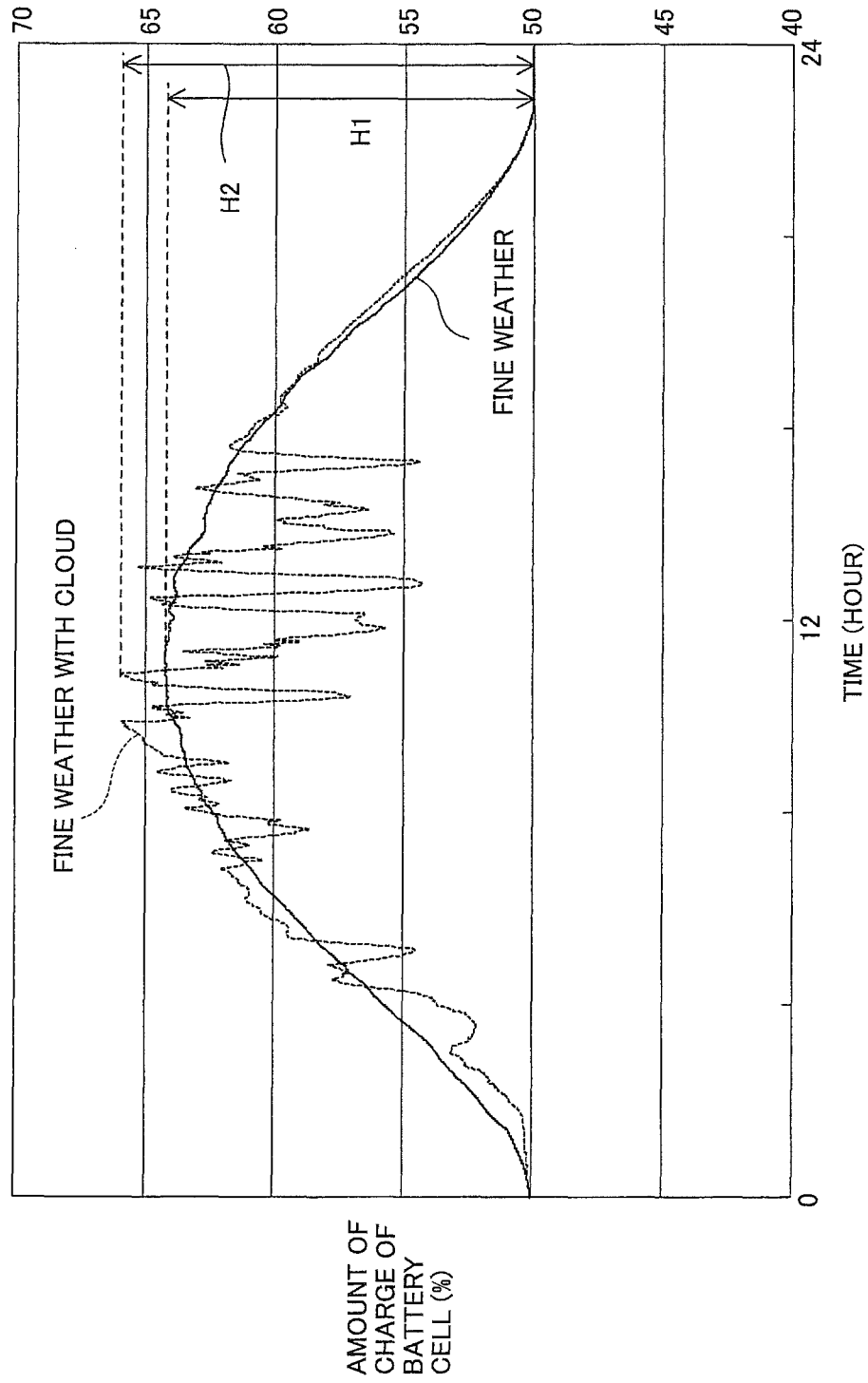
FIG. 11 is a graph showing one-day transitions of the amount of charge of a battery cell in fine weather and fine weather with clouds (no charge/discharge control according to the first embodiment).

FIG. 11 shows a transition of the amount of charge of the battery cell 31 in a case where no charge/discharge control according to the first embodiment is performed but charge/discharge control by a method of 24-hour moving average is performed. As shown in FIG. 11, the maximum depth difference H1 of charge/discharge in fine weather is about 14% of the maximum amount of charge of the battery cell, and the maximum depth difference H2 of charge/discharge in fine weather with clouds is about 15% of the maximum amount of charge of the battery cell. In other words, it is understood that the maximum depth differences of charge/discharge in fine weather and fine weather with clouds are not much different from each other.

It is known that the maximum depth difference of charge/discharge greatly influences the lifetime of the battery cell 31, but the maximum depth differences of charge/discharge in fine weather and in fine weather with clouds are not much different from each other, as described above so that it is understood that the lifetimes of the battery cell 31 in fine weather and fine weather with clouds are not much different from each other. In other words, it is understood that the lifetimes of the battery cell in fine weather and fine weather with clouds are not much different from each other regardless of the frequency of large fluctuation if overall transitions in fine weather and fine weather with clouds are substantially identical to each other.

Here, effects of the output power pattern shown in FIG. 10 on the power grid 50 are considered. In order to consider the effects on the power grid 50, the output power pattern shown in FIG. 10 is analyzed by FFT (fast Fourier transform). Results of analysis of FIG. 10 by the FFT are shown in FIG. 12.

Figure 12:
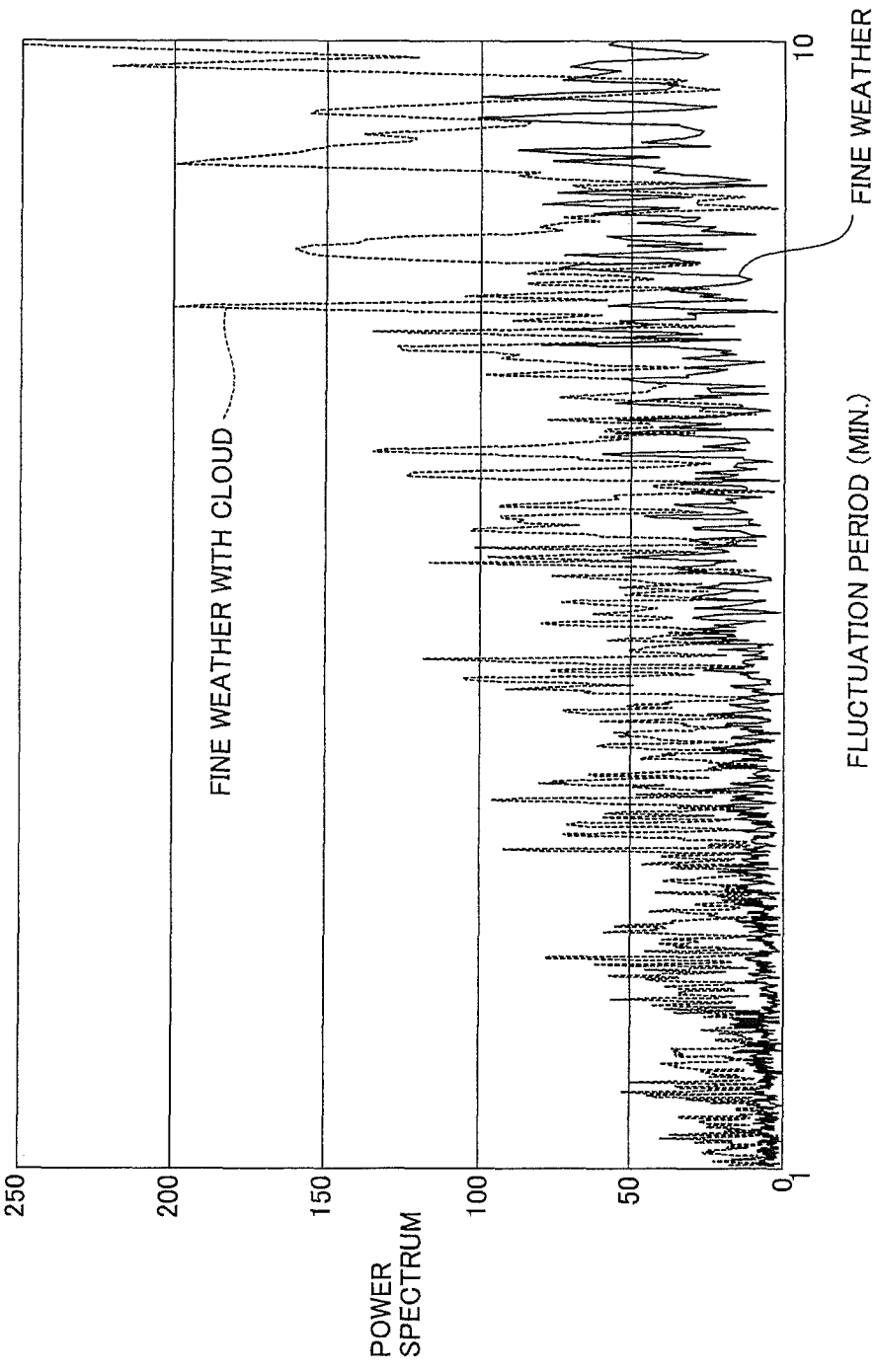
FIG. 12 is a diagram showing results of analysis of a change in the power output to the power grid (no charge/discharge control) in fine weather and fine weather with clouds shown in FIG. 10 by FFT (fast Fourier transform).

As shown in FIG. 12, it is understood that power spectra in fine weather and fine weather with clouds are much different from each other. Particularly, it can be seen that the power spectrum in fine weather is approximately ¼ of the power spectrum in fine weather with clouds in a frequency domain for approximately several minutes that is a load frequency control (LFC) region. Therefore, it is understood that adverse effects of output fluctuation on the power grid 50 are small without performing the charge/discharge control in fine weather.

Figure 13:
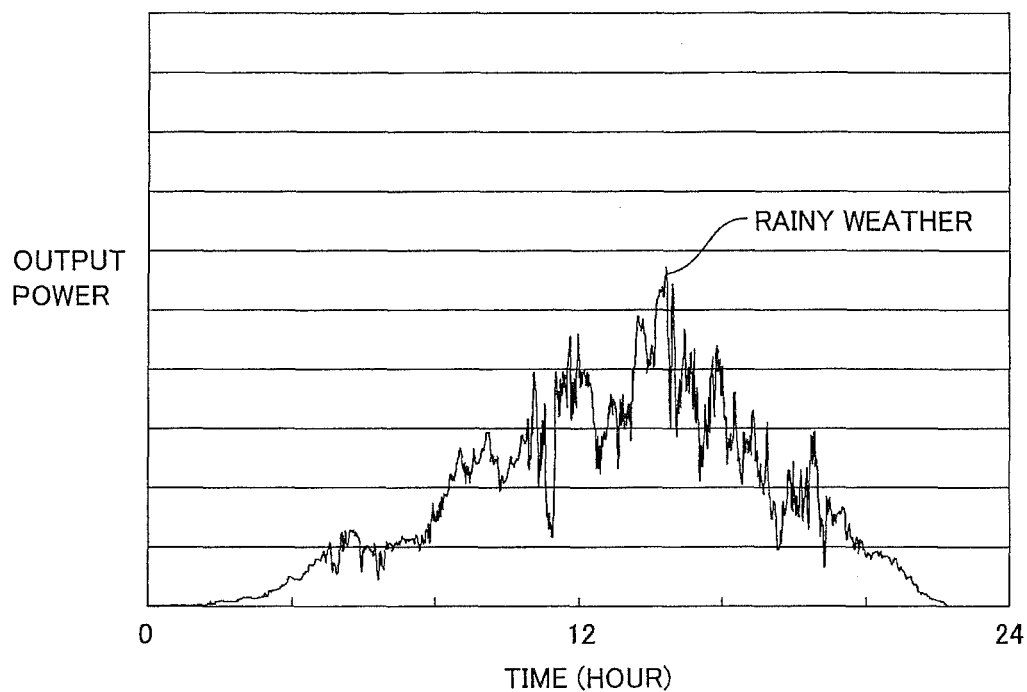
FIG. 13 is a graph showing a one-day transition of power output to the power grid in rainy weather (no charge/discharge control).
Figure 14:
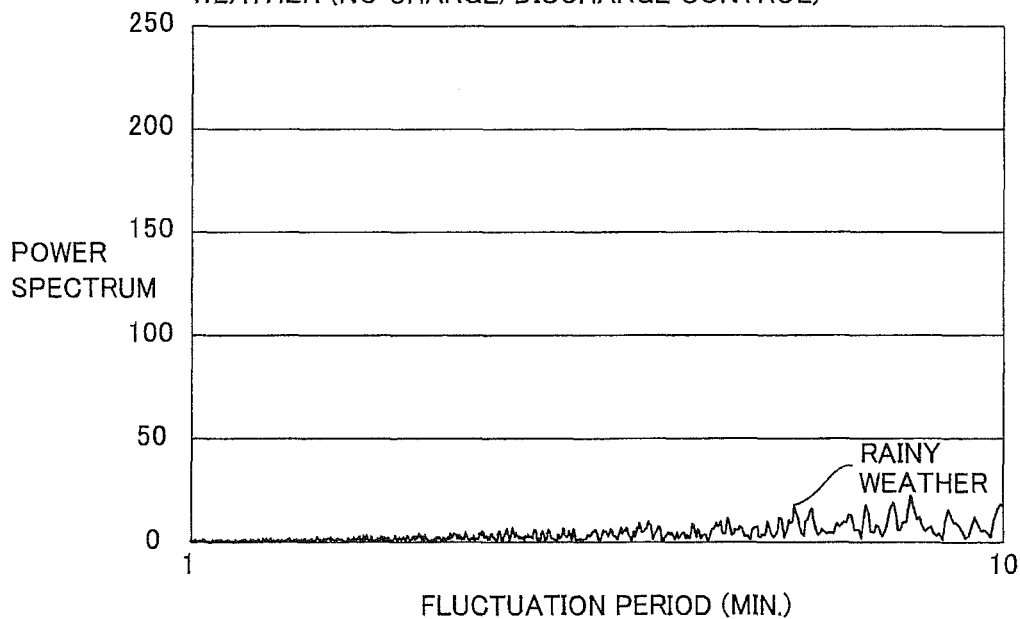
FIG. 14 is a diagram showing a result of analysis of a change in the power output to the power grid (no charge/discharge control) in rainy weather shown in FIG. 13 by the FFT (fast Fourier transform).

Next, effects of output fluctuation in rainy weather on the power grid 50 are considered. FIGS. 13 and 14 show a fluctuation transition of power actually generated per day in rainy weather and results of analysis by the FFT. FIG. 13 shows power (power generated by the power generator 2) output to the power grid 50 in a case where no charge/discharge control is performed.

It is understood that output power (generated power) fluctuates frequently also in rainy weather, as shown in FIG. 13 whereas a power spectrum by the FFT analysis is very small, as shown in FIG. 14. In other words, it is understood that adverse effects on the power grid 50 are small without performing the charge/discharge control in rainy weather.

Accordingly, it has been found as the results of the FFT analyses that the power spectra are small in fine weather and rainy weather, and the adverse effects on the power grid 50 are small even if no charge/discharge control is performed so that the need to perform the charge/discharge control is low. It has been proved that the depths of charge/discharge greatly influencing the lifetime of the battery cell 31 in a case where the charge/discharge control is performed and a case where no charge/discharge control is performed are not much different from each other regardless of the frequency of large fluctuation if overall transitions of the generated power in fine weather and rainy weather are substantially identical to each other. Therefore, no charge/discharge control is performed in fine weather and rainy weather, whereby the frequency of the charge/discharge control can be reduced, and the lifetime of the battery cell can be increased.

Figure 15:
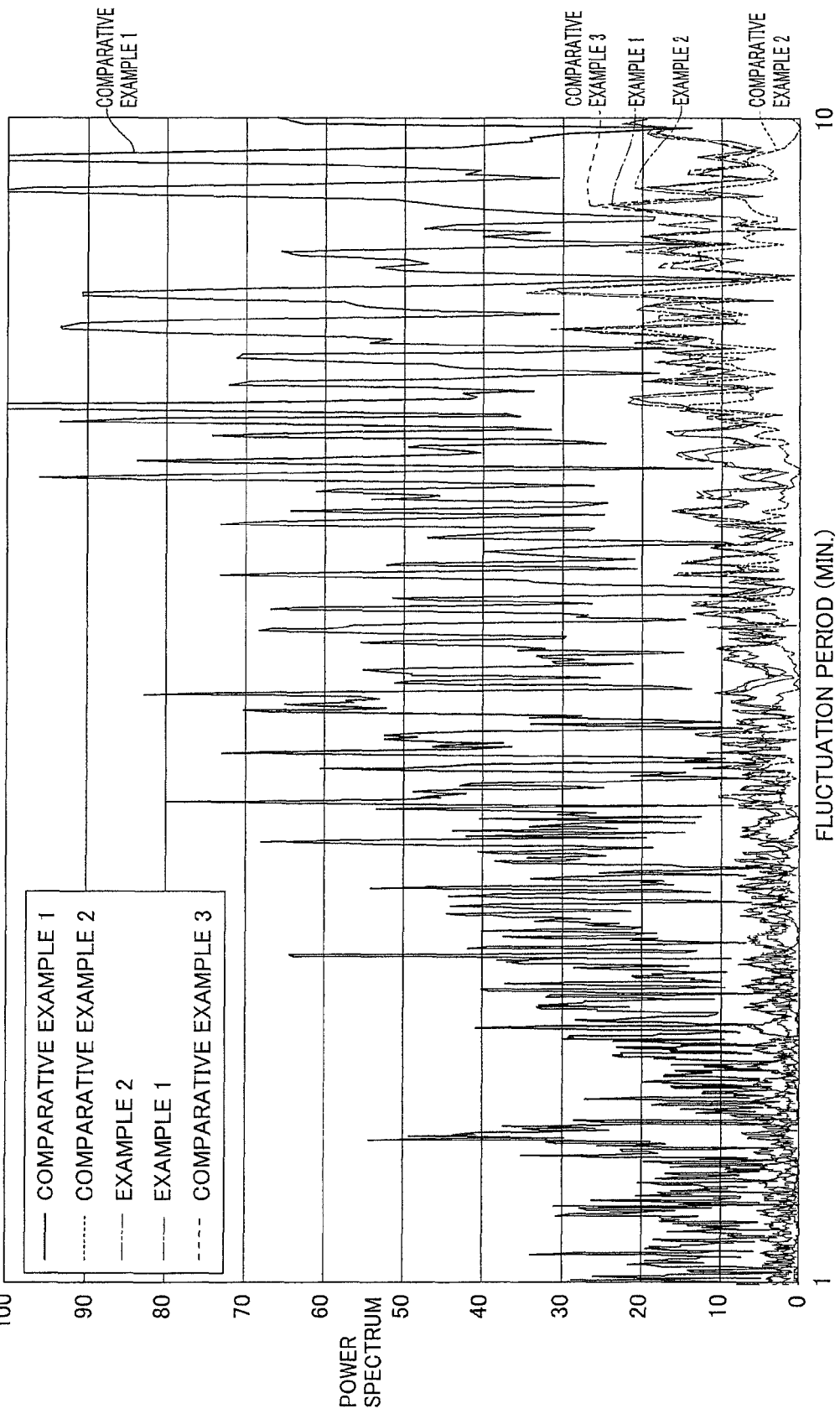
FIG. 15 is a diagram showing results of FFT analysis to examine the effect of reduction in adverse effects on the power grid by performing the charge/discharge control.

Next, results of verification of the effects of reducing adverse effects of performing the charge/discharge control on the power grid 50 are described. FIG. 15 shows results of FFT analyses in comparative example 1, comparative example 2, comparative example 3, Example 1, and Example 2. Comparative example 1 is an example of a case where no charge/discharge control is performed (case where the power generated by the power generator 2 is directly output to the power grid). Comparative example 2 is an example of a case where charge/discharge control by a general method of moving average different from the method of moving average according to the first embodiment is continuously performed all day. The general method of moving average difference from the method of moving average according to the first embodiment in which the number of samplings (sampling period) is reduced at the start and termination of the charge/discharge control is to calculate a target output value on the basis of a fixed number of samplings even at start and termination of the charge/discharge control. Comparative example 3, Example 1, and Example 2 are examples of cases where monitoring of generated power is started when the power generated by the power generator 2 exceeds 10% of rated output, and the charge/discharge control is started when a change in the generated power exceeds 5% of the generated power before change while the generated power does not return to the vicinity of the value of the generated power before change within standby time, similarly to the first embodiment. Furthermore, in comparative example 3, Example 1, and Example 2, the charge/discharge control in which the number of samplings is reduced at start and termination of the charge/discharge control is performed, similarly to the first embodiment. Comparative example 3 is an example of providing no standby time for determining whether or not the generated power has returned to the vicinity of the value of the generated power before change, dissimilarly to the first embodiment. Example 1 and Example 2 are examples of providing standby time, and in Example 1 and Example 2, the standby time is 1 minute and 2 minutes, respectively.

As shown in FIG. 15, power spectra of results of FFT analyses in comparative example 2, comparative example 3, Example 1, and Example 2 are reduced as compared with a power spectrum in comparative example 1. In other words, the power spectra are greatly reduced in comparative example 2, comparative example 3, Example 1, and Example 2 as compared with a case where no charge/discharge control is performed (comparative example 1). It is understood that in comparative example 3, Example 1, and Example 2, output power can be smoothed at the same level as a case where the general method of moving average is carried out all day (comparative example 2) so that the adverse effects on the power grid 50 can be suppressed at the same level as the case where the general method of moving average is carried out all day. Accordingly, it has been proved that the charge/discharge control according to the first embodiment is performed, whereby the adverse effects on the power grid can be reduced, similarly to a case where the charge/discharge control is continuously performed all day by the general method of moving average.

Results of simplified estimation of the lifetime of the battery cell 31 in comparative example 2, comparative example 3, Example 1, and Example 2 are shown in table 1 described below. Here, in each of comparative example 2, comparative example 3, Example 1, and Example 2, the sum of the amount of charge and the amount of discharge is calculated on the basis of power output data for about two months, and the reciprocal thereof is employed as the estimated value of the lifetime of the battery cell. The values in comparative example 3, Example 1, and Example 2 are values obtained by standardizing the value in comparative example 2.

TABLE 1

| | Comparative Example 2 | Comparative Example 3 | Example 1 | Example 2 |
|---|---|---|---|---|
| Estimated Value of Lifetime of Cell | 1 | 1.14 | 1.16 | 1.19 |

As shown in Table 1, in each of comparative example 3, Example 1, and Example 2, the lifetime of the battery cell can be expected to be increased to at least 10% as compared with comparative example 2. Furthermore, the estimated value of the lifetime of the battery cell in each of Example 1 and Example 2 is improved as compared with comparative example 3. This is conceivably because a period to perform the charge/discharge control was shortened by providing the 1-minute or 2-minute standby time so that the charging/discharging count of the battery cell 31 was reduced.

Figure 16:
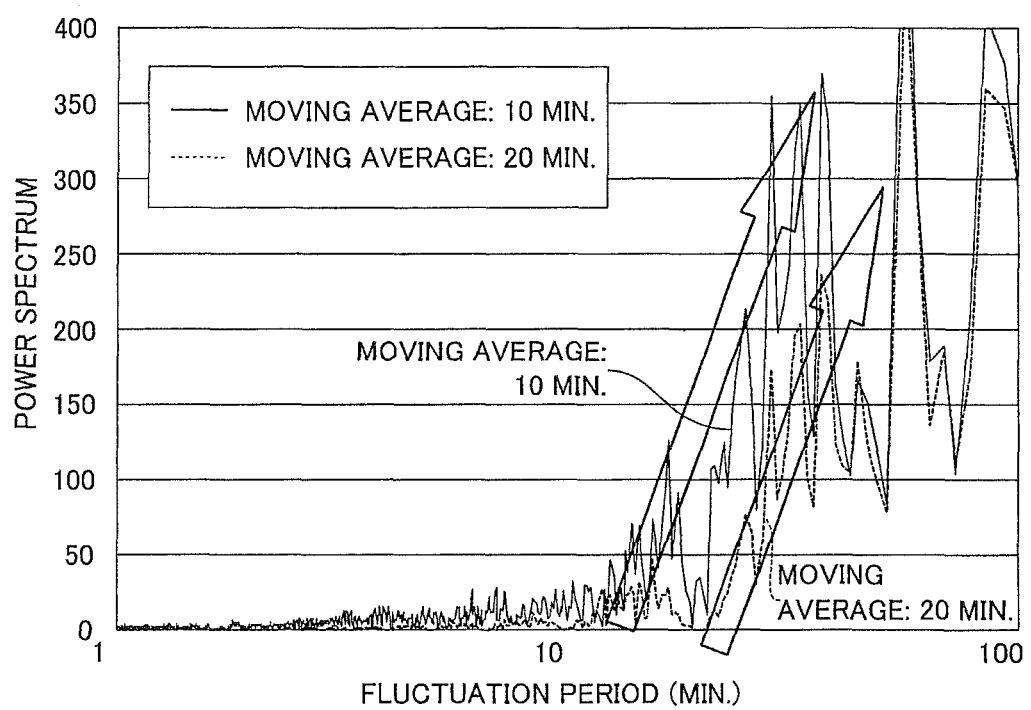
FIG. 16 is a diagram for illustrating a sampling period in the charge/discharge control.

Next, the sampling period of the method of moving average is considered. Results of FFT analysis in a case where the sampling period that is a period to acquire power output data is 10 minutes and results of FFT analysis in a case where the sampling period is 20 minutes are shown in FIG. 16. As shown in FIG. 16, it is understood that in the case where the sampling period is 10 minutes, fluctuation in a range where the fluctuation period is less than 10 minutes is suppressed whereas fluctuation in a range where the fluctuation period is at least 10 minutes is not much suppressed. In the case where the sampling period is 20 minutes, fluctuation in a range where the fluctuation period is less than 20 minutes is suppressed whereas fluctuation in a range where the fluctuation period is at least 20 minutes is not much suppressed. Therefore, it is understood that there is good correlation between the length of the sampling period and the fluctuation period capable of being suppressed by the charge/discharge control. Thus, the range in which the fluctuation period can be suppressed can effectively vary by setting the sampling period. It is understood that the sampling period is set to be not less than the fluctuation period dealt with by the load frequency control, and in particular, preferably set to be of the range from the vicinity of the latter half of T1 to T2 (vicinity of long periods) to at least T1 in order to suppress the fluctuation period capable of being dealt with by the load frequency control on which the present system mainly focuses. In an example shown in FIG. 7, for example, it is understood that the fluctuation period dealt with by the load frequency control can be mostly suppressed by employing the 20-minute or more sampling period. However, if the sampling period is increased, the necessary capacity of the battery cell tends to increase, and the sampling period that is not much longer than T1 is preferably selected.

Second Embodiment

Next, a power generation system (photovoltaic power generation system 100) according to a second embodiment of the present invention is described with reference to FIG. 17.

Figure 17:
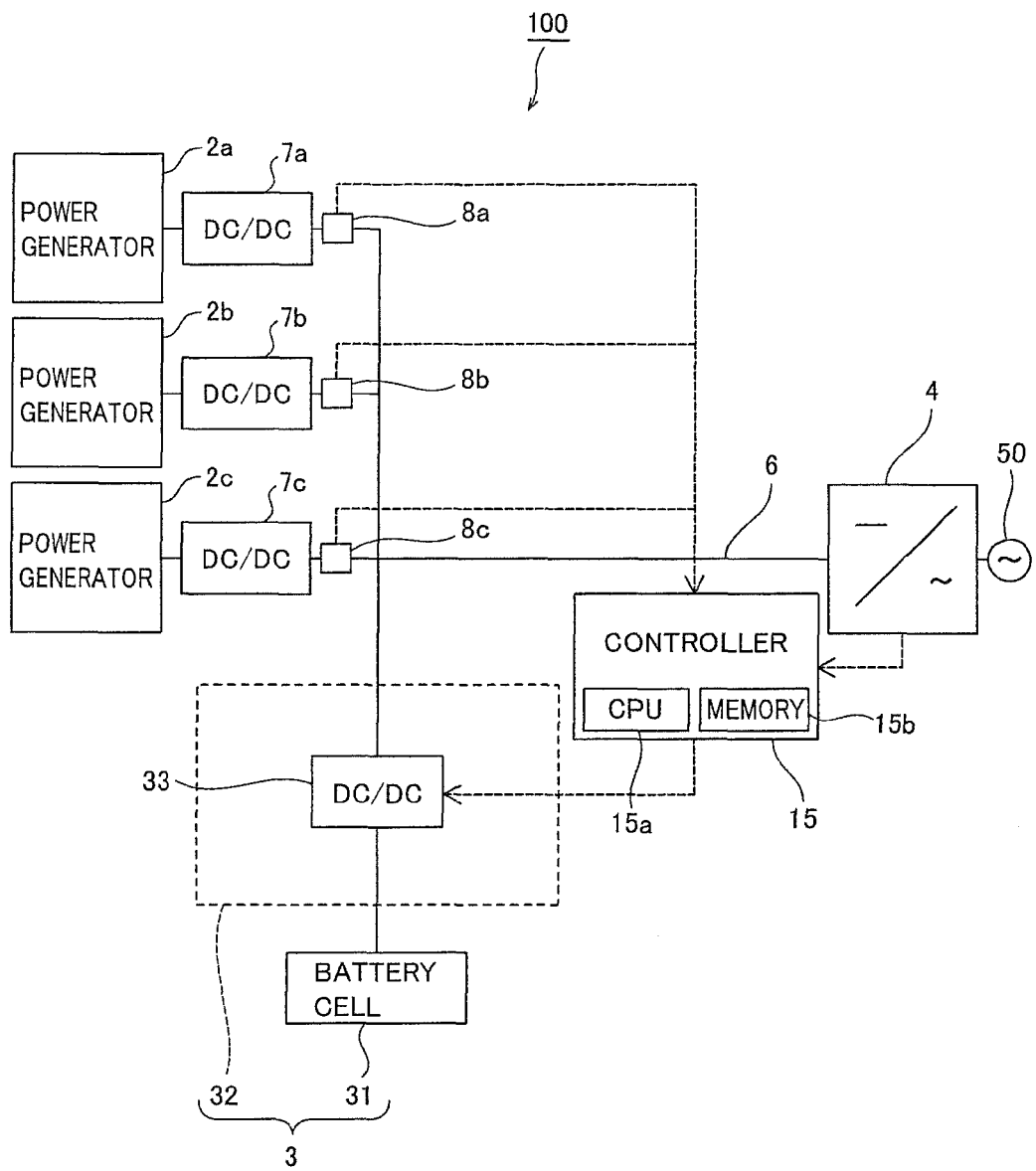
FIG. 17 is a block diagram showing the structure of a power generation system according to a second embodiment of the present invention.

As shown in FIG. 17, the photovoltaic power generation system 100 includes three power generators 2a, 2b, and 2c each including a solar cell generating power with sunlight, a battery 3, a power output unit 4, and a controller 15. The total power generated by the power generators 2a, 2b, and 2c is preferably set to be not more than generated power capable of being processed by the power output unit 4. The controller 15 is an example of the "charge/discharge control device" in the present invention.

The three power generators 2a, 2b, and 2c are connected in parallel to the power output unit 4. DC-DC converters 7a, 7b, and 7c each having an MPPT control function are provided on the power generators 2a, 2b, and 2c, respectively. The DC-DC converters 7a, 7b, and 7c each have a function of converting the voltage of the power generated by the respective power generators 2a, 2b, and 2c to a constant voltage and outputting the same to the power output unit 4. The DC-DC converters 7a, 7b, and 7c are examples of the "DC-DC converter" in the present invention.

The controller 15 includes a CPU 15a and a memory 15b. The controller 15 acquires the power generated by the power generators 2a, 2b, and 2c from power output detection units 8a, 8b, and 8c provided on the output sides of the DC-DC converters 7a, 7b, and 7c, respectively. The controller 15 calculates a target output value on the basis of data on the sum of the power generated by the power generators 2a, 2b, and 2c and performs charge/discharge control of a battery cell 31 to compensate for a difference between the sum of the power generated by the power generators 2a, 2b, and 2c and the aforementioned calculated target output value.

The structure of the photovoltaic power generation system 100 other than the aforementioned structure is similar to that of the photovoltaic power generation system 1 according to the aforementioned first embodiment.

According to the second embodiment, as hereinabove described, a plurality of power generators 2a, 2b, and 2c are provided, and the DC-DC converters 7a, 7b, and 7c are so provided as to correspond to the respective power generators 2a, 2b, and 2c. According to this structure, in the second embodiment, the power output of the other power generators 2b and 2c can be prevented from reduction as long as the other power generators 2b and 2c do not become shaded even if one power generator 2a becomes shaded so that the power output thereof is reduced, whereas the power output of the overall power generator 2 is reduced even if only part of the power generator 2 becomes shaded if the single power generator 2 is employed as in the aforementioned first embodiment. Thus, the overall power generated by the power generators can be suppressed from reduction. Thus, fluctuation in the generated power can be suppressed, and hence adverse effects on a power grid 50 can be suppressed.

The remaining effects of the second embodiment are similar to those of the aforementioned first embodiment.

Third Embodiment

Next, a power generation system (photovoltaic power generation system 200) according to a third embodiment of the present invention is described with reference to FIG. 18. In this third embodiment, an example of controlling charge/discharge of a battery cell 31 in response to the operation state of a load 210 in addition to performing charge/discharge control according to the aforementioned first embodiment is described.

Figure 18:
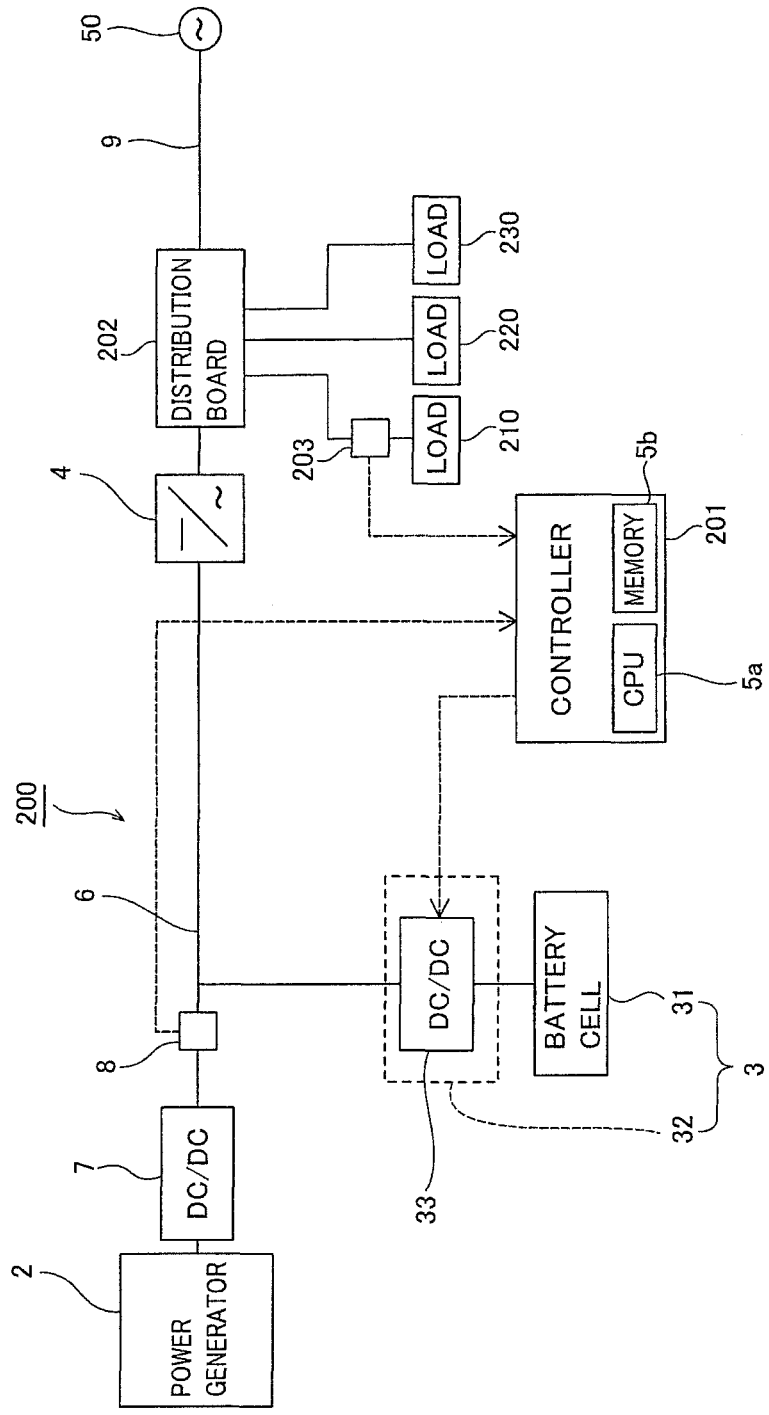
FIG. 18 is a block diagram showing the structure of a power generation system according to a third embodiment of the present invention.

As shown in FIG. 18, the photovoltaic power generation system 200 includes a power generator 2, a battery 3, a power output unit 4, a controller 201, a DC-DC converter 7, and a power output detection unit 8. A distribution board 202 is provided on an AC-side bus 9 between the power output unit 4 and a power grid 50. Furthermore, three loads 210, 220, and 230 are connected to the AC-side bus 9 through the distribution board 202. The load 210 is frequently employed in time (about 2 minutes to about 20 minutes) of the lower limit period T2 to the upper limit period T1 of fluctuation periods dealt with by load frequency control (LFC) and is a load having relatively large power consumption, which is an IH heater or the like, for example. The loads 220 and 230 are loads such as a light having small power consumption or loads in which on/off switching is less frequently performed. The controller 201 is an example of the "charge/discharge control device" in the present invention.

According to the third embodiment, a sensor 230 detecting the operation state of the load 210 is provided. The controller 201 can determine whether the load 210 is employed (on) or not employed (off) on the basis of an output signal of the sensor 203. The controller 201 controls the charge/discharge of the battery cell 31 in order to suppress a change in power input to/output from the power grid 50 resulting from the on/off switching of the load 210 in addition to performing the charge/discharge control according to the aforementioned first embodiment. In other words, if the controller 201 determines that the load 210 has been switched on from off, the power consumption of the load 210 is increased to decrease power (sale power) reversely flowing into the power grid 50 from the photovoltaic power generation system 200 or increase power (purchase power) flowing into the photovoltaic power generation system 200 from the power grid 50 so that the controller 201 discharges power from the battery cell 31 in order to suppress the sale power from decrease or the purchase power from increase. Similarly, if the controller 201 determines that the load 210 has been switched off from on, the power consumption of the load 210 is decreased to increase the sale power or decrease the purchase power so that the controller 201 charges the battery cell 31 in order to suppress the purchase power from decrease or the sale power from increase.

According to the third embodiment, as hereinabove described, the charge/discharge of the battery cell 31 is performed in order to detect a change in the operation state of the load 210 connected to the AC-side bus 9 between the power generator 2 and the power grid 50 and suppress the change in power input to/output from the power grid 50 resulting from the change in the operation state of the load 210. According to this structure, under a condition where the reverse flow is generated, for example, at least part of a decrease in the output power can be discharged from the battery cell 31 if the load 210 operates to decrease the power output to the power grid 50 by power consumed by the load 210. If the load 210 stops operating to increase the power output to the power grid 50 by the power consumed by the load 210, the battery cell 31 can be charged with at least part of an increase in the output power. Thus, fluctuation in the power input to/output from the power grid 50 by the change in the operation state of the load 210 can be suppressed, and hence effects on the power grid 50 can be suppressed.

Next, results of simulation conducted to prove the effect of the third embodiment of the present invention are described with reference to FIGS. 19 to 23.

Figure 19:
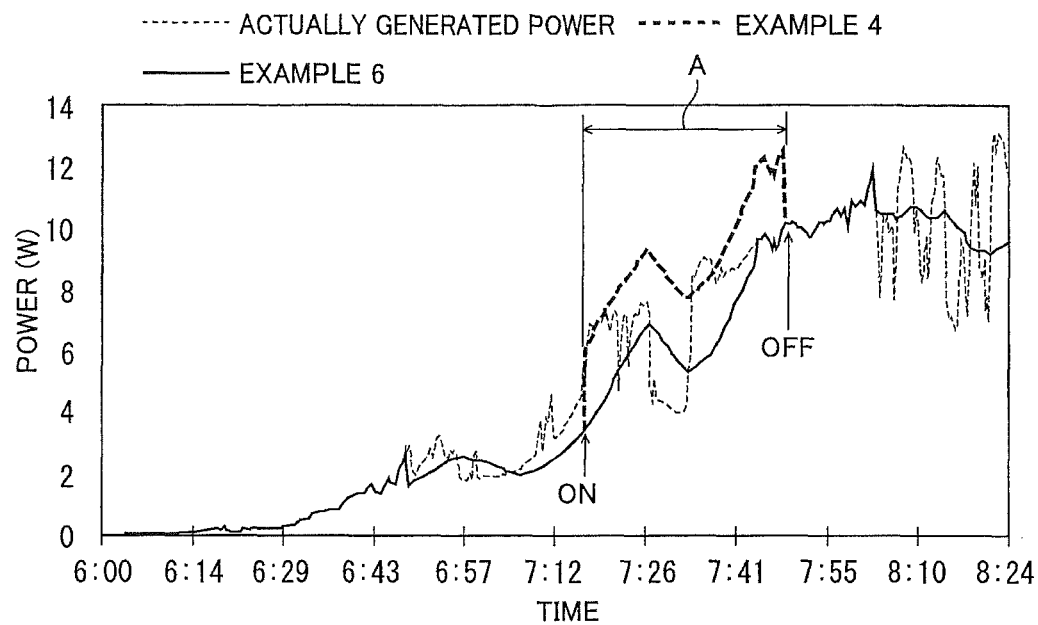
FIG. 19 is a graph for illustrating the charge/discharge control of the power generation system according to the third embodiment of the present invention (Example 4).
Figure 20:
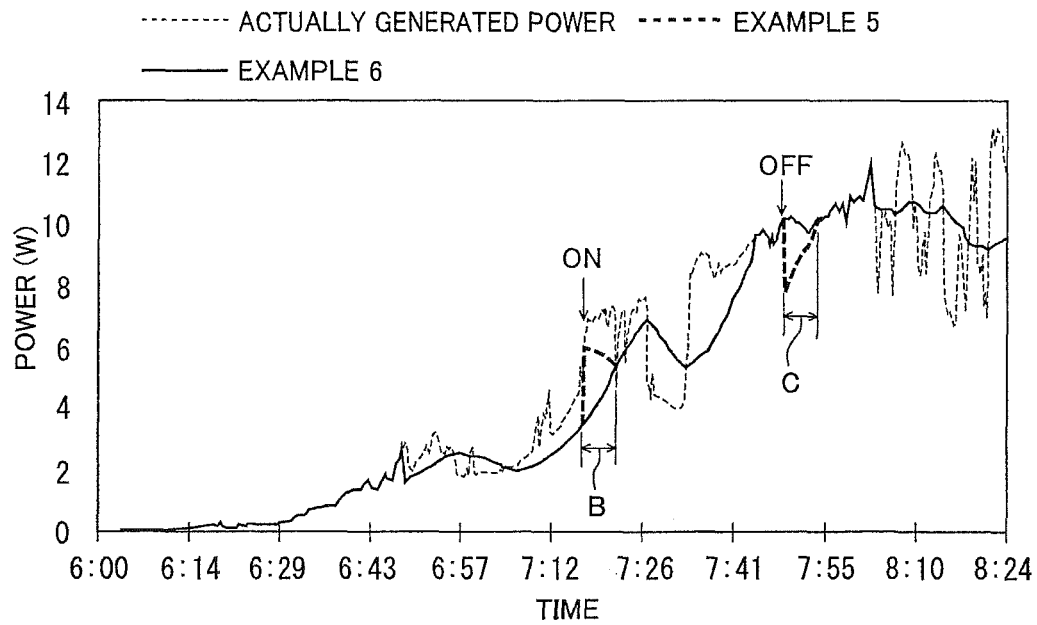
FIG. 20 is a graph for illustrating the charge/discharge control of the power generation system according to the third embodiment of the present invention (Example 5).
Figure 21:
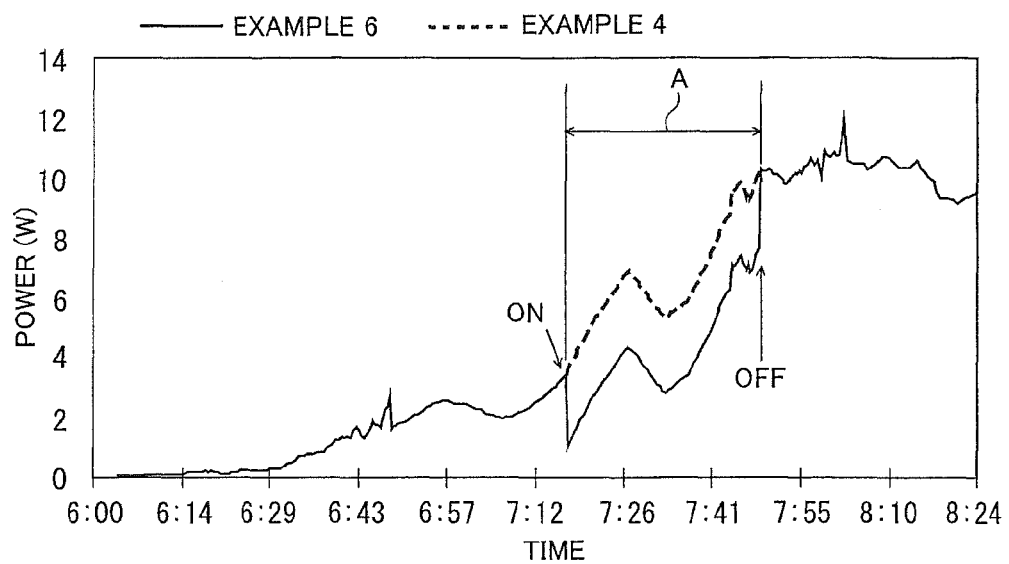
FIG. 21 is a graph for illustrating the effect of the charge/discharge control of the power generation system according to the third embodiment of the present invention (Example 4).
Figure 22:
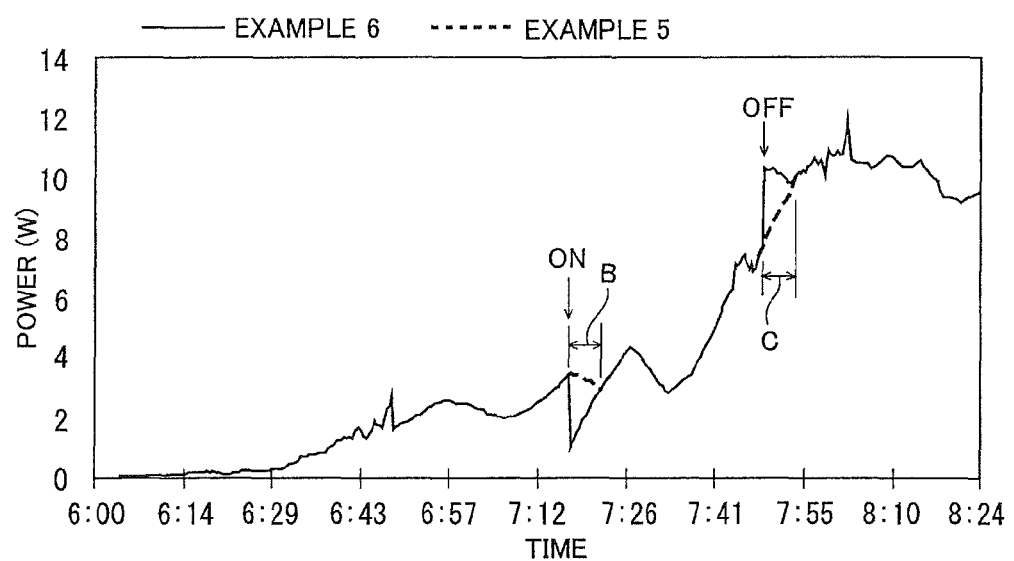
FIG. 22 is a graph for illustrating the effect of the charge/discharge control of the power generation system according to the third embodiment of the present invention (Example 5).

In this simulation, a transition of the power output to the power grid 50 in a case where the control according to the third embodiment is performed was examined as compared with a transition of the power generated by the power generator 2. As the control according to the third embodiment, in Example 4, the discharge of the battery cell 31 was continuously performed during a period when the load 210 is on in a case where the load 210 was switched on/off, while the charge/discharge control according to the aforementioned first embodiment was performed. In other words, charge/discharge was performed to add charging power equal to the power consumed by the load 210 during the period when the load 210 is on to the charging/discharging power of the battery cell 31 calculated in the first embodiment. In Example 5, charge/discharge was performed to add discharging power (in a case of switching the load 210 on) or charging power (in a case of switching the load 210 off) equal to the power consumed by the load 210 to the charging/discharging power of the battery cell 31 calculated in the first embodiment immediately after the switching in the case where the load 210 was switched on/off, and thereafter the battery cell 31 was so controlled that the power added immediately after the switching was gradually decreased to zero over 5 minutes, while the charge/discharge control according to the aforementioned first embodiment was performed. In Example 6, only the control according to the aforementioned first embodiment was performed. FIGS. 19 and 20 show transitions of power output from the power output unit in cases where the control in Examples 4, 5, and 6 is performed. FIGS. 21 and 22 show transitions of power reversely flowing into the power grid 50 (transitions of power passing between the load 210 and the load 220, to be exact) in cases where the control in Examples 4, 5, and 6 is performed.

As shown in FIG. 19, in Example 4, power obtained by adding the power equal to the power consumed by the load 210 to output power calculated on the basis of the transition of generated power exhibited in Example 6 is output in a period A from a time point when the load 210 is switched on to a time point when the load 210 is switched off. Therefore, in the period A in Example 4, the charge/discharge control is performed to add the discharging power from the battery cell 31, equal to the power consumed by the load 210 as compared with Example 6. In another period other than the period A, a transition in Example 4 is similar to a transition in Example 6.

As shown in FIG. 20, in Example 5, power obtained by adding the power equal to the power consumed by the load 210 to the output power calculated on the basis of the transition of the generated power exhibited in Example 6 is output, and thereafter the output power is gradually decreased to output power equal to the output power in Example 6 in a period B for 5 minutes from a time point when the load 210 is switched on. At this time, in the period B in Example 5, the charging/discharging power of the battery cell 31 is calculated by adding the discharging power equal to the power consumed by the load 210 when the load 210 is on, and the added discharging power is gradually decreased to zero over 5 minutes.

In a period C for 5 minutes from a time point when the load 210 is switched off, power obtained by subtracting the power equal to the power consumed by the load 210 from the output power calculated on the basis of the transition of the generated power exhibited in Example 6 is output at start of the period C, and thereafter the output power is gradually increased to output power equal to the output power in Example 6. At this time, in the period C in Example 5, the charging/discharging power of the battery cell 31 is calculated by subtracting the discharging power equal to the power consumed by the load 210 when the load 210 is off, and the subtracted discharging power is gradually decreased to zero over 5 minutes.

As shown in FIGS. 21 and 22, it is understood that in Example 6, the power output from the power output unit 4 is decreased by the power consumed by the load 210 so that shape fluctuation in the power output to the power grid 50 is generated when the load 210 is switched on and off. On the other hand, it is understood that in Examples 4 and 5, smooth transitions without shape fluctuation are exhibited in the periods A to C when the sharp fluctuation is generated in Example 6. Therefore, it is understood that effects on the power grid 50 in Examples 4 and 5 are fewer than those in Example 6.

Figure 23:
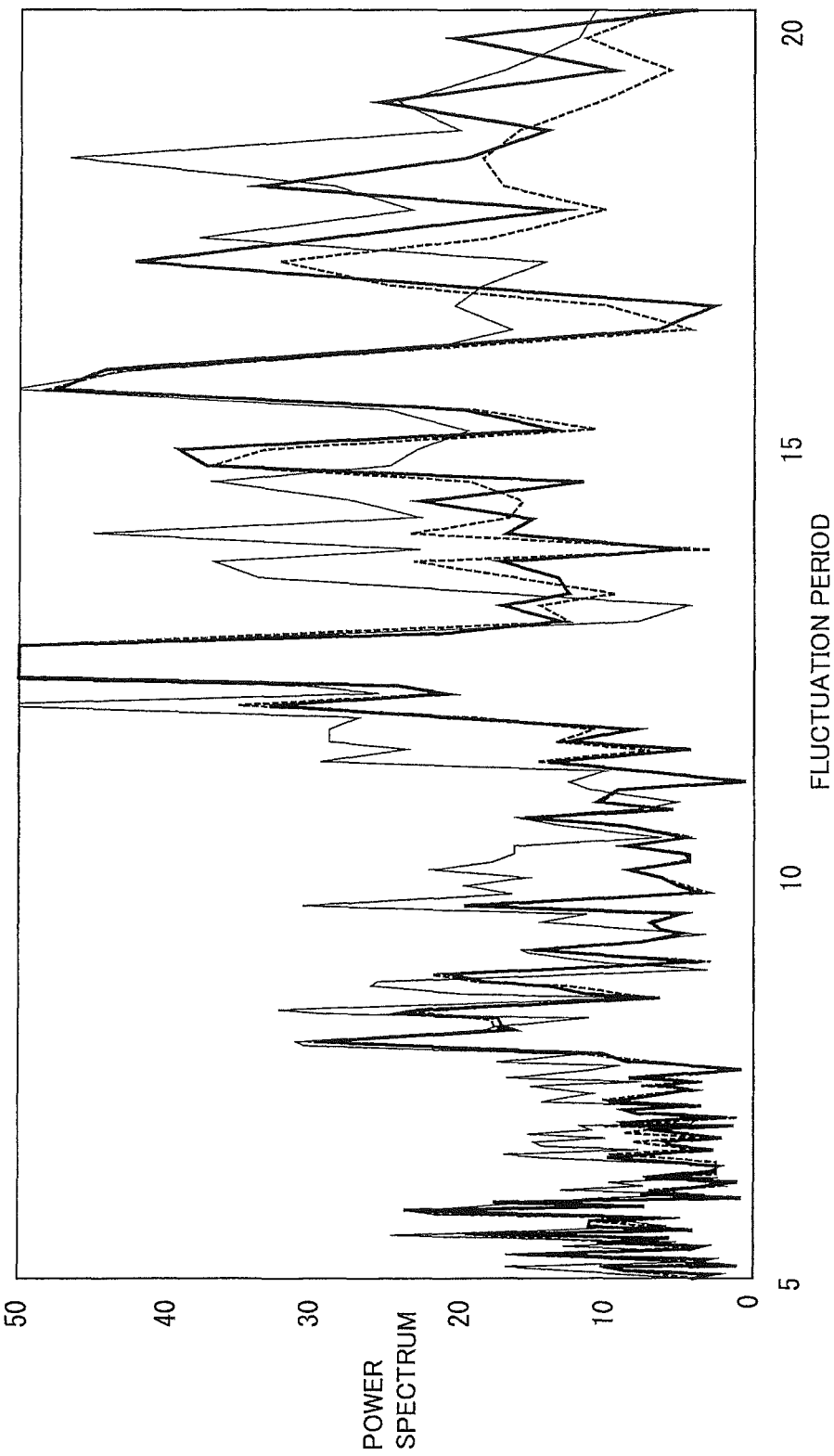
FIG. 23 is a graph for illustrating the effect of the charge/discharge control of the power generation system according to the third embodiment of the present invention (Examples 4 and 5).

As shown in FIG. 23, it is understood that in Examples 4 and 5, frequency fluctuation is suppressed on the whole as compared with Example 6. Furthermore, it is understood that, the frequency fluctuation in Example 4 and the frequency fluctuation in Example 5 are suppressed at substantially the same level as each other. As shown in FIGS. 19 and 20, in Example 5, the power equal to the power consumed by the load 210 is subtracted in the period C, whereas the power equal to the power consumed by the load 210 is added similarly to Example 4. Thus, the charge/discharge of the battery cell 31 hardly trends in one direction of charge or discharge. Consequently, it is understood that the discharging depth of the battery cell 31 can be suppressed so that Example 5 has an advantage in the increase in the lifetime and the decrease in the capacity of the battery cell 31, and Example 5 is more efficient than Example 4.

Fourth Embodiment

Next, a power generation system (photovoltaic power generation system 300) according to a fourth embodiment of the present invention is described with reference to FIG. 24. In this fourth embodiment, an example of controlling charge/discharge control on the basis of power (purchase power or sale power) input to/output from a power grid 50, dissimilarly to the aforementioned first embodiment in which the charge/discharge control is performed on the basis of the generated power is described.

Figure 24:
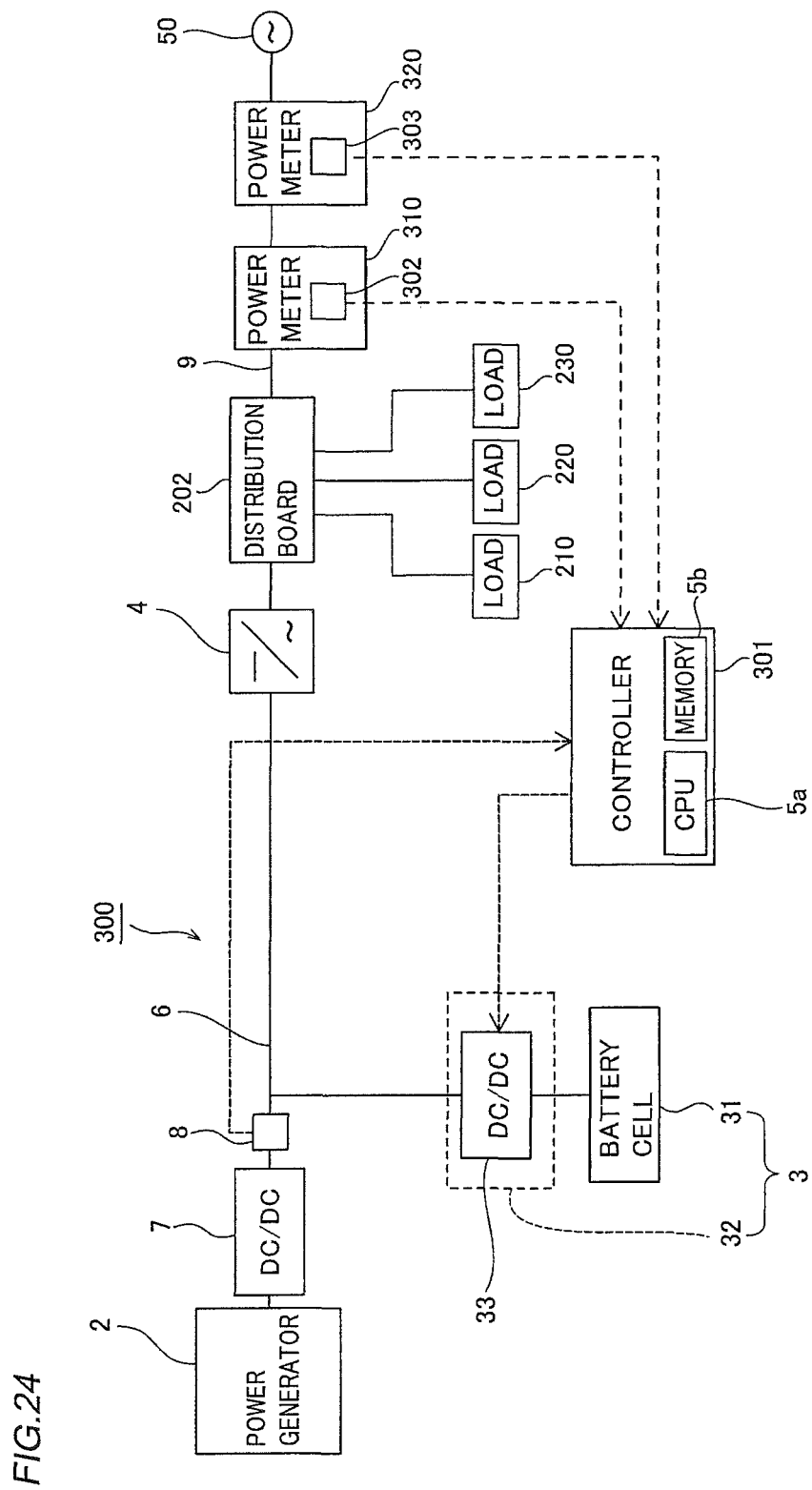
FIG. 24 is a block diagram showing the structure of a power generation system according to a fourth embodiment of the present invention.

As shown in FIG. 24, the photovoltaic power generation system 300 includes a power generator 2, a battery 3, a power output unit 4, a controller 301, a DC-DC converter 7, and a power output detection unit 8. Three loads 210, 220, and 230 are connected to an AC-side bus 9 between the power output unit 4 and the power grid 50 through a distribution board 202. The controller 301 is an example of the "charge/discharge control device" in the present invention.

A power meter 310 metering power sold from the photovoltaic power generation system 300 to the power grid 50 and a power meter 320 metering power purchased from the power grid 50 are provided on the AC-side bus 9 on the side of the power grid 50 with respect to the distribution board 202. The power meters 310 and 320 are provided with power sensors 302 and 303, respectively. The power sensors 302 and 303 are examples of the "power detection portion" in the present invention.

The controller 301 can acquire data on the power (purchase power data or sale power data) input to/output from the power grid 50 at each prescribed detection time interval (not more than 30 seconds, for example) on the basis of output of the power sensors 302 and 303. The controller 301 acquires sale power−purchase power=detected power data (sale power and purchase power are values of at least zero) as the data (input/output power data) on the power input to/output from the power grid 50. The controller 301 calculates a target output value on the basis of the past input/output power data and performs charge/discharge of a battery cell 31 to compensate for at least part of a difference between actually input/output power and the target output value. In other words, the controller 301 controls a DC-DC converter 33 to charge the battery cell 31 with at least part of surplus power if the actually input/output power is larger than the target output value, and controls the DC-DC converter 33 to discharge the battery cell 31 for at least part of the shortage in the power if the actually input/output power is small than the target output value.

The controller 301 starts the charge/discharge control if power generated by the power generator 2 is at least prescribed generated power (control initiating power output) while the amount of change in the input/output power (purchase power or sale power) is at least a prescribed amount of change (control initiating fluctuation amount). The controller 301 does not start the charge/discharge control if the input/output power has returned to the vicinity of the power before change within standby time even if the amount of change in the input/output power is at least the control initiating fluctuation amount. The control initiating fluctuation amount according to the fourth embodiment is set to be larger than the maximum amount of change in the input/output power at each detection time interval in the daytime in fine weather (fine weather with almost no clouds), for example in view of the detection time interval, a load amount, etc. Particularly in the fourth embodiment, the input/output power (=sale power−purchase power) is positive or negative, so that a method in which control is performed with the absolute value of the amount of change or a method in which appropriate power is added to the input/output power (=sale power−purchase power) in response to the load amount, not the method shown in the first embodiment in which the amount of change in the generated power and the generated power before change are simply compared with each other is preferable in view of the rated output of the power generator 2, the rated power consumption of the loads, etc., for example. According to the fourth embodiment, the control initiating fluctuation amount is 5% of the rated output of the power generator 2.

Setting of the detection time interval, a sampling period, a method for calculating the target output value, the standby time, etc. regarding the charge/discharge control is similar to that of the aforementioned first embodiment.

Figure 25:
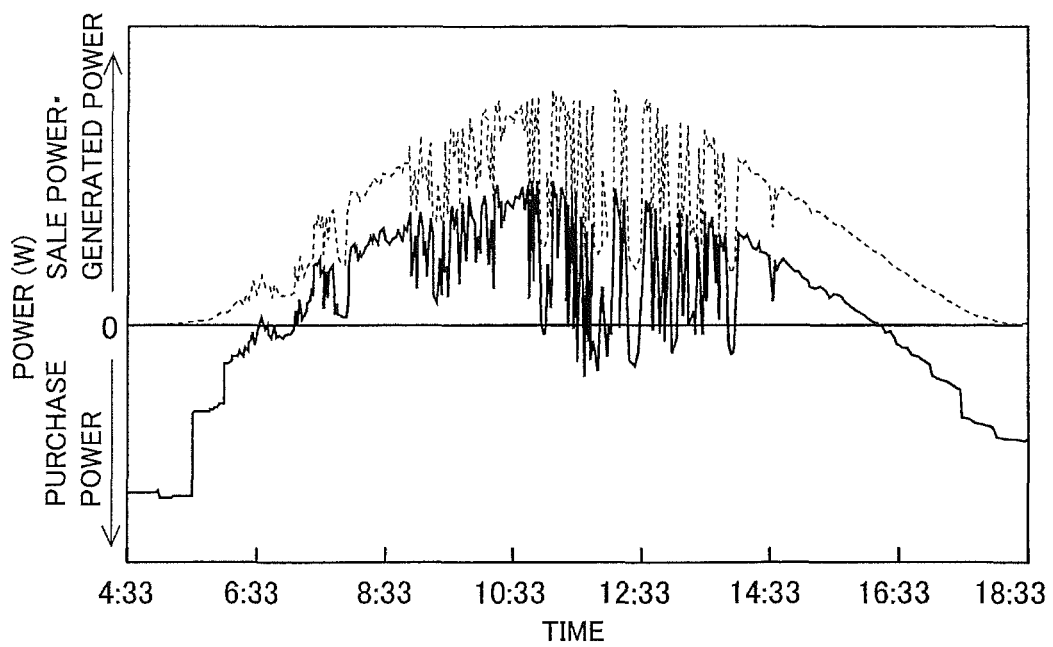
FIG. 25 is a graph for illustrating the charge/discharge control of the power generation system according to the fourth embodiment of the present invention.

A transition of the power generated by the power generator 2 on a particular day and a transition of the input/output power (=sale power−purchase power) on the same day are shown in FIG. 25. The transition of the input/output power substantially corresponds to the transition of the generated power less power consumed by the loads (loads 210, 220, and 230). As shown in FIG. 25, the frequency of sharp fluctuation in the power consumed by the loads throughout the day in respect to a general household is not high, so that the transition of the generated power and the transition of the input/output power fluctuate in substantially the same manner. Therefore, the charge/discharge control is performed on the basis of the input/output power, whereby fluctuation in the input/output power can be suppressed while effects on the power grid 50 can be suppressed.

According to the fourth embodiment, as hereinabove described, the controller 301 is so formed as to perform the charge/discharge control of the battery cell 31 if the amount of change in the input/output power of the power sensors 302 and 303 is at least the control initiating fluctuation amount, whereby no charge/discharge control is performed if the amount of change in the input/output power of the power sensors 302 and 303 is smaller than the control initiating fluctuation amount, and hence the charging/discharging count of the battery cell 31 can be reduced. Furthermore, the controller 301 is so formed as to perform the charge/discharge control if the input/output power does not return to the vicinity of the input/output power before change within the standby time from a time point when the input/output power is changed by at least the control initiating fluctuation amount, whereby the controller 301 does not perform the charge/discharge control if the input/output power returns to the vicinity of the input/output power before change within the standby time, even if the amount of change in the input/output power of the power sensors 302 and 303 is at least the control initiating fluctuation amount, and hence the charging/discharging count of the battery cell 31 can be further reduced. Thus, the lifetime of the battery cell 31 can be increased. Furthermore, similarly to the aforementioned first embodiment, it has been found that effects of fluctuation in the power generated by the power generator 2 on the power grid 50 is small even when the controller 301 does not perform the charge/discharge control, if the input/output power returns to the vicinity of the input/output power before change within the standby time even if the amount of change in the input/output power of the power sensors 302 and 303 is smaller or larger than the control initiating fluctuation amount. Therefore, according to the fourth embodiment, the lifetime of the battery cell 31 can be increased while the effects of fluctuation in the power generated by the power generator 2 on the power grid 50 are suppressed. The control initiating power output is preferably set to be high as compared with the first embodiment. Specifically, the control initiating power output must be set in response to the load amount, but the control initiating power output is set by adding 200 W to 10% of the rated output of the power generator 2 set in the first embodiment if the amount of consumption in the loads transitions in the vicinity of 200 W, for example.

Next, the length of the detection time interval is described with reference to FIGS. 26 to 29.

Figure 26:
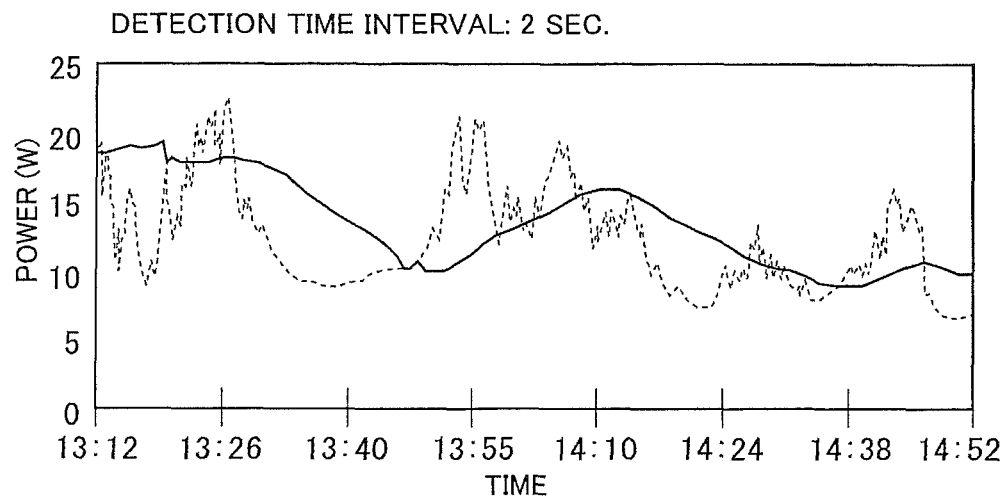
FIG. 26 is a graph showing a result of simulation of the charge/discharge control in a case where power output data is acquired at a 2-second detection time interval.
Figure 27:
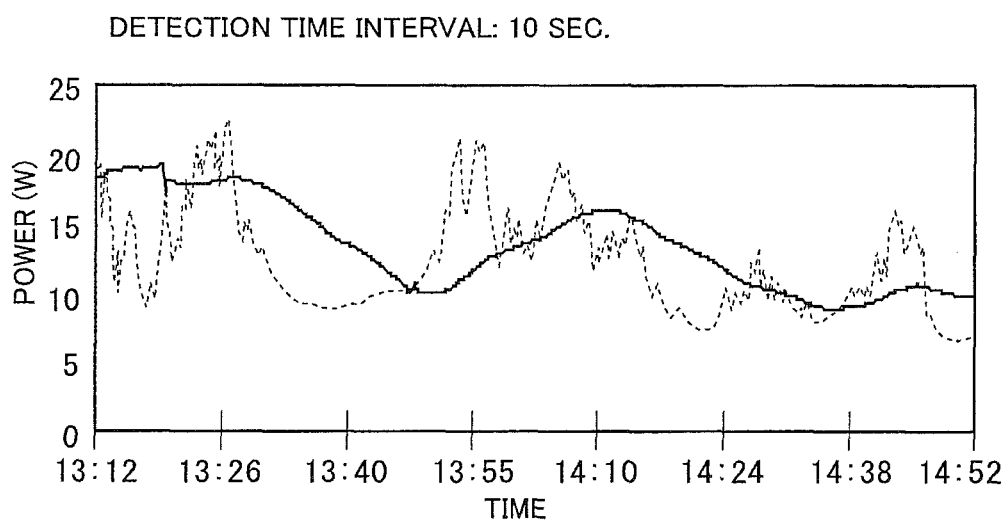
FIG. 27 is a graph showing a result of simulation of the charge/discharge control in a case where the power output data is acquired at a 10-second detection time interval.
Figure 28:
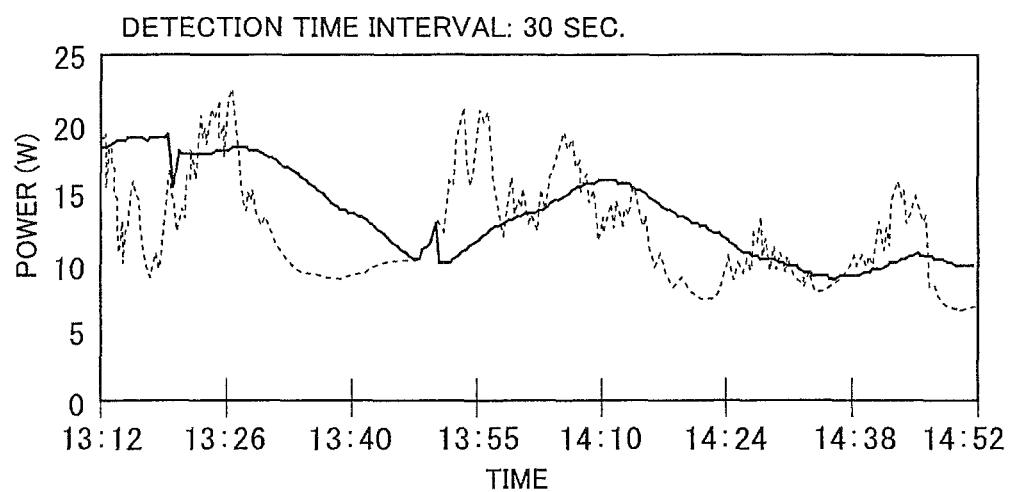
FIG. 28 is a graph showing a result of simulation of the charge/discharge control in a case where the power output data is acquired at a 30-second detection time interval.

FIGS. 26, 27, and 28 show results of simulation in cases where the charge/discharge control according to the first embodiment is performed, employing 2 seconds, 10 seconds, and 30 seconds as the detection time interval, respectively.

As shown in FIGS. 26 to 28, in any of these cases of 2 seconds, 10 seconds, and 30 seconds, good smoothing is obtained. It is understood that power after smoothing more smoothly transitions as the detection time interval is shorter.

Figure 29:
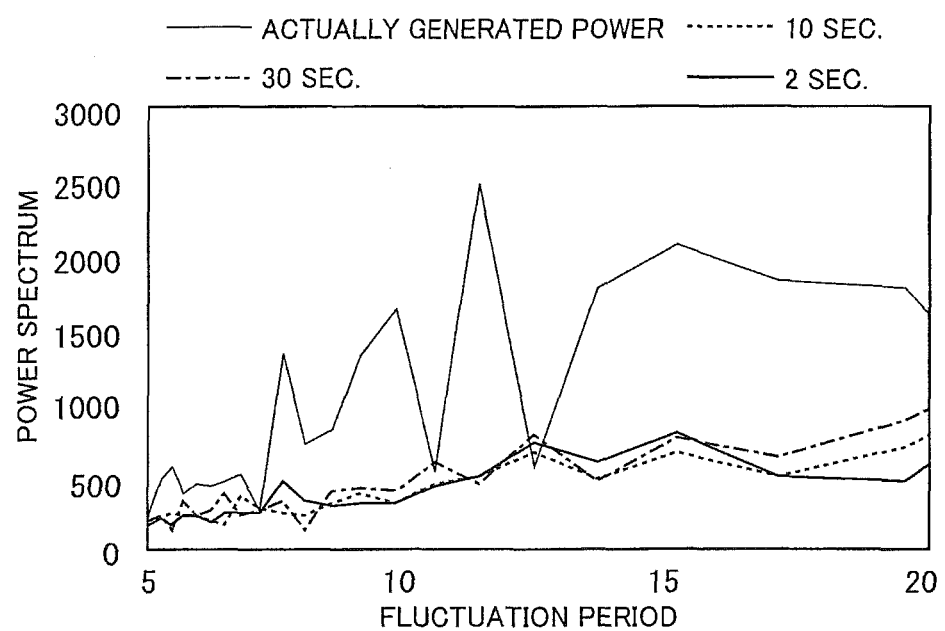
FIG. 29 is a diagram showing results of analysis by the FFT (fast Fourier transform) of transitions of the output power in a case where smoothing is performed at the 2-second, 10-second, and 30-second detection time intervals.

FIG. 29 shows results of analysis of the transitions of the power after smoothing shown in FIGS. 26 to 28 by fast Fourier transform. As shown in FIG. 29, it is understood that in any of these cases of 2 seconds, 10 seconds, and 30 seconds, fluctuation in actually generated power can be suppressed. It is understood that in the case where the detection time interval is 2 seconds, the power spectrum is small on the whole in fluctuation periods of 5 minutes to 20 minutes, and the effect of smoothing is superior.

Thus, the detection time interval is appropriately selected, whereby the effect of smoothing can be further improved. The number of pieces of data employed to calculate a moving average is increased when the detection time interval is shortened, and hence an appropriate detection time interval must be selected in view of the processing capacity of the control device and the necessary degree of smoothing.

Each set value is preferably appropriately changed in response to the detection time interval. In FIGS. 26 to 28, 2 seconds, 10 seconds, and 30 seconds are employed as the detection time interval, and the control initiating fluctuation amount is 2%, 4%, and 6%, respectively.

An indication of a relation between the control initiating fluctuation amount and the detection time interval is shown below. A change in power generated by a photovoltaic power generation system is influenced mainly by the movement of clouds. Therefore, the change in the generated power is relatively smooth, and is generated by at least seconds. It has been found as a result of our consideration that effects on the power spectrum after FFT analysis tend to increase in a case where a change of at least 1%/sec. is included in the detection time interval of about 2 seconds. In a case where the detection time interval was relatively long, suppression of the power spectrum was difficult when the control initiating fluctuation amount was simply set at 1%/sec.×detection time interval (second). This is because effects on the power spectrum are large if a change of 1%/sec. is included in 10 seconds, in a case where the detection time interval is 10 seconds, for example, and 10% (=1 (%/sec.)×10 seconds) obtained by simple calculation is applied only in a case where a change of at least 1%/sec. continues on average over 10 seconds so that the range is narrower than that in a case where a change of 1%/sec. is included in 10 seconds.

It has been understood as results of various types of consideration that it is effective to employ a range obtained from the following expression including a natural logarithm, frequently employed as an expression expressing a natural phenomenon as the control initiating fluctuation amount.

$$\text{control initiating fluctuation amount} \leq 2 \times \log_e(t+1)$$

Here, (t+1) is employed in order for the control initiating fluctuation amount to be at least zero where t>0, and the control initiating fluctuation amount is multiplied by 2 to be so adjusted that the control initiating fluctuation amount is equal to the amount (=2%) of change of 1%/sec. when the detection time interval is about 2 seconds.

Next, a method for smoothing by a first order lag method is described with reference to FIGS. 30 to 33.

A target output value Q (t) calculated with the first order lag method is obtained by the following expression.

$$Q(t)=Q(t-\Delta t)+\{W(t)-Q(t-\Delta t)\}/N \tag{1}$$

Here, W (t) is detected power (generated power or input/output power, for example), and N is a value (the number of pieces of power output data or the input/output power included in time T) obtained by dividing a prescribed time constant T by a detection time interval Δt.

The target output value Q (t) at time t is calculated by adding a value obtained by dividing a difference between the previously calculated target output value Q (t−Δt) and the generated power or the input/output power W (t) at time t by N to the previously calculated target output value Q (t−Δt). Even when smoothing is performed by this first order lag method, the present invention is applied to set the target output value, whereby the effect of the present invention that the lifetime of the storage portion is increased can be obtained while effects of fluctuation in the power generated by the power generator on the power grid are suppressed.

Figure 30:
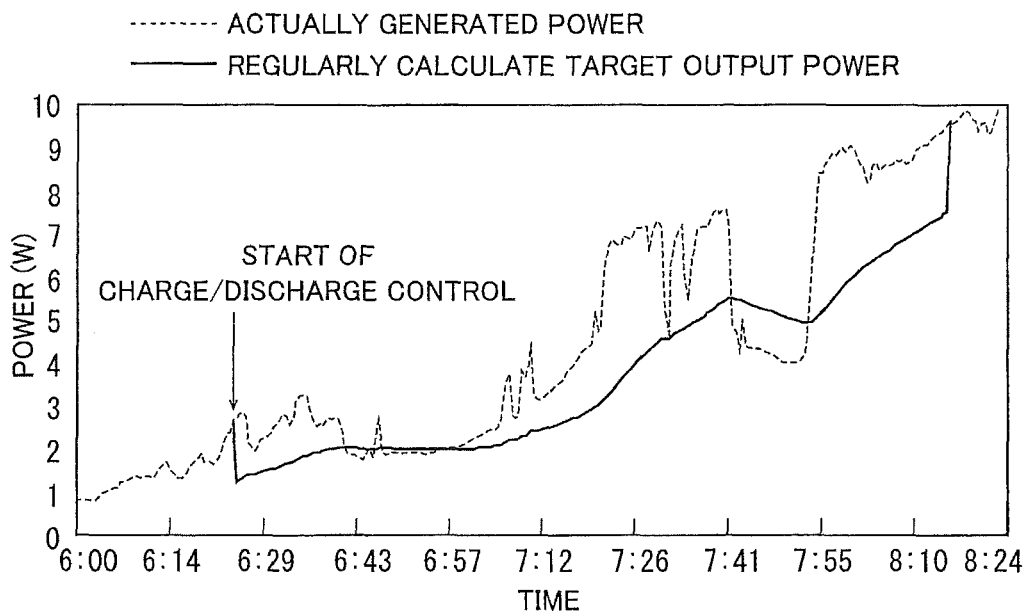
FIG. 30 is a graph showing a result of simulation in a case where the charge/discharge control is performed by a first order lag method.

As described above, the target output value calculated by the first order lag method is calculated employing the previously calculated target output value. Therefore, in respect to the charge/discharge control started in the middle of a day according to each of the aforementioned first to fourth embodiments, the target output value is not calculated before the start of the charge/discharge control so that the target output value at the start cannot be calculated. One method in which the target output value is regularly calculated also before the start of the charge/discharge control, and the target output value at the start of the charge/discharge control is calculated employing the value of the previously calculated target output value when the charge/discharge control starts is conceivable. However, when the generated power tends to increase as shown in FIG. 30, for example, the target output value is greatly influenced by the past generated power so that the target output value is greatly decreased due to effects of the less previously generated power, and sharp fluctuation having effects on the power grid is included at the start of the charge/discharge.

At the start of the charge/discharge control, the target output value Q (t) is calculated employing the previously calculated target output value Q (t−Δt) as the previous generated power or input/output power W (t−Δt) when the target output value Q (t) is calculated in the aforementioned expression (1). Then, the target output value Q (t) is calculated by the aforementioned expression (1). Thus, fluctuation in output power at the start of the charge/discharge control can be prevented.

Figure 31:
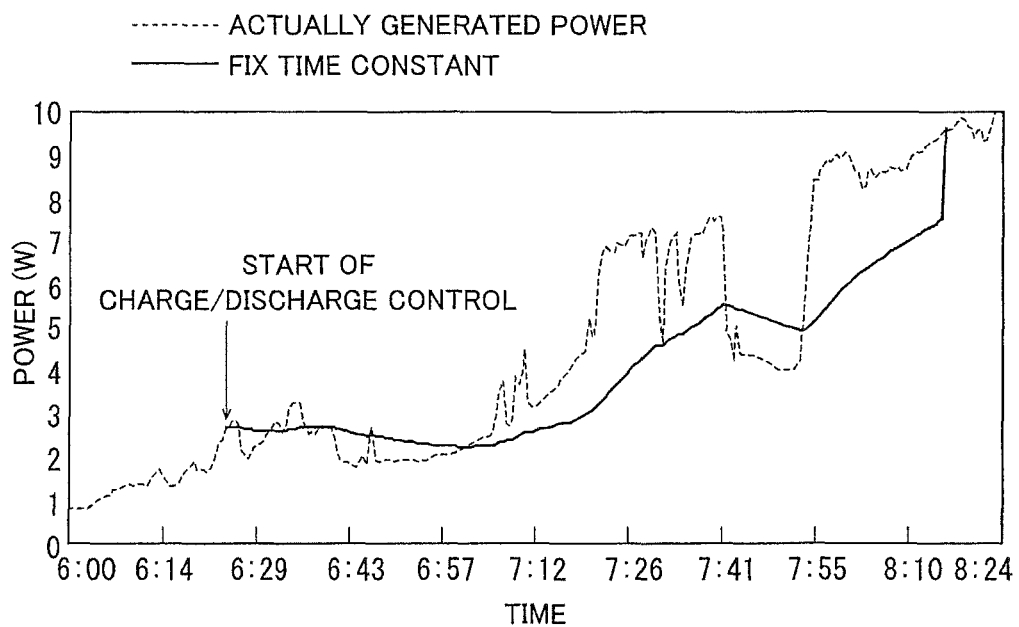
FIG. 31 is a graph showing a result of simulation in a case where the charge/discharge control is performed by the first order lag method.
Figure 32:
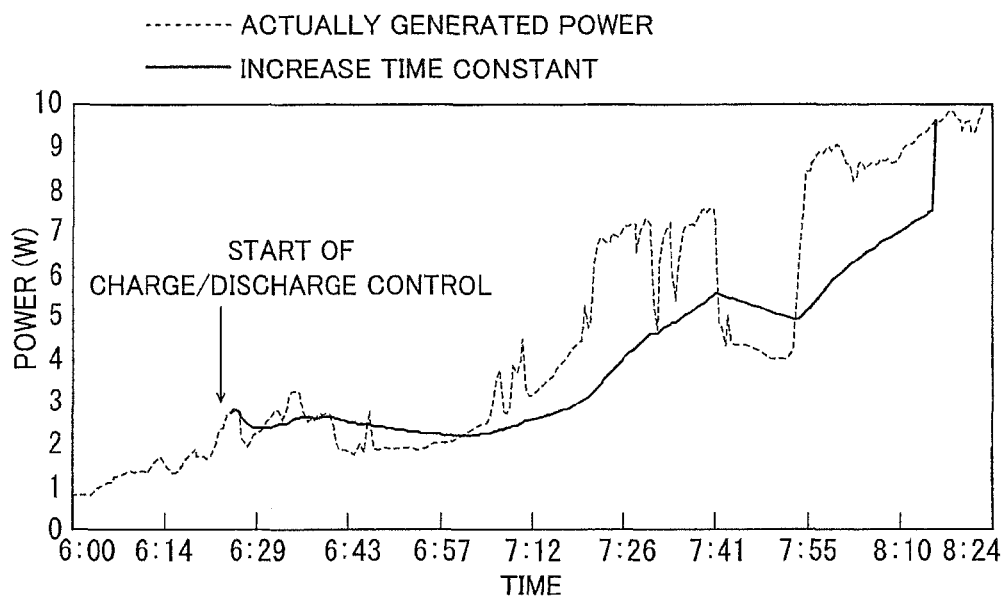
FIG. 32 is a graph showing a result of simulation in a case where the charge/discharge control is performed by the first order lag method.

When Q (t−Δt) is equal to W (t−Δt) only at the start of the charge/discharge control, the time constant T or the sampling number N may be a constant (T=Δt×N), or T or N may be initially equal to 1, and thereafter the time constant T may be gradually increased. FIG. 31 shows a transition of output power in a case where the time constant T is fixed to be equal to 20 minutes (N=40, detection time interval: 30 seconds). FIG. 32 shows a transition of output power in a case where the sampling number N is increased one by one from 1 to 40 at each time interval Δt. As shown in FIGS. 31 and 32, if the target output value is calculated while Q (t−Δt) is rendered equal to W (t−Δt) at the start of the charge/discharge control, output power can be smoothed without sharp fluctuation at the start of the charge/discharge control. Qualitative smoothing is shown in FIGS. 30 to 32, but it has been confirmed as a result of FFT analysis that the effect of smoothing can be obtained even by the first order lag method, similarly to the method of moving average.

Figure 33:
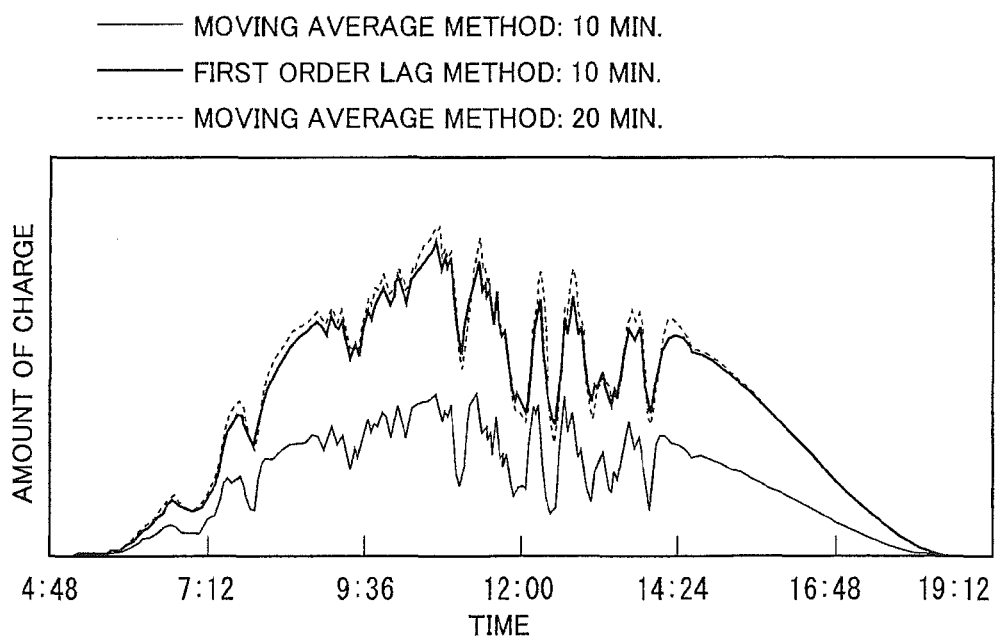
FIG. 33 is a graph for illustrating a relation between the time constant of the first order lag method and the sampling period of a method of moving average.

Next, a relation between the time constant T in the first order lag method and the sampling period in the method of moving average is described. FIG. 33 shows a transition of the amount of charge of the battery cell in a case where smoothing is performed by the method of moving average, employing 10 minutes and 20 minutes as the sampling period and a transition of the amount of charge of the battery cell in a case where smoothing is performed by the first order lag method, employing 10 minutes as the time constant T. The detection time intervals (Δt) are the same as each other (30 seconds, for example). As shown in FIG. 33, it is understood that substantially the same result is obtained in a case of employing the method of moving average having the 20 minute sampling period and a case of employing the first order lag method having the 10 minute time constant T. In the method of moving average, the sampling period is preferably at least a frequency (about 2 minutes to about 20 minutes, for example) capable of being dealt with by LFC, whereas in the first order lag method, the time constant is preferably rendered relatively short due to a tendency to increase the amount of charge/discharge. For example, the time constant is preferably at least about 2 minutes to about 10 minutes, and more preferably at least about 10 minutes.

The embodiments and Examples disclosed this time must be considered as illustrative in all points and not restrictive. The range of the present invention is shown not by the above description of the embodiments but by the scope of claims for patent, and all modifications within the meaning and range equivalent to the scope of claims for patent are included.

For example, while the example of employing the solar cell as the power generator 2 (power generators 2a, 2b, and 2c) has been described in each of the aforementioned first to fourth embodiments, the present invention is not restricted to this but another natural-energy power generator such as a wind turbine generator may alternatively be employed.

While the example of employing the Li-ion battery cell or the Ni-MH battery cell as the battery cell has been shown in each of the aforementioned first to fourth embodiments, the present invention is not restricted to this but another secondary cell may alternatively be employed. A capacitor may alternatively be employed as an example of the "storage portion" in the present invention instead of the storage portion.

While the example of shortening the sampling period at both the start (initial stage) and the termination (final stage) of the charge/discharge control has been shown in each of the aforementioned first to fourth embodiments, the present invention is not restricted to this but the sampling period may alternatively be shortened at only either the start (initial stage) or the termination (final stage) of the charge/discharge control.

While the example of providing the DC-DC converters 7a to 7c on the three power generators 2a to 2c, respectively has been shown in the aforementioned second embodiment, the present invention is not restricted to this but a single DC-DC converter may alternatively be connected to a plurality of power generators. For example, respective separate DC-DC converters may alternatively be connected to the power generators 2a, 2b, and 2c, or a single DC-DC converter may alternatively be connected to the power generators 2a and 2b while another DC-DC converter may alternatively be connected to the power generator 2c.

While the example of employing 48 V as the voltage of the battery cell 31 has been described in each of the aforementioned first to fourth embodiments, the present invention is not restricted to this but a voltage other than 48 V may alternatively be employed. The voltage of the battery cell is preferably not more than 60 V.

While the example of employing 10% of the rated output of the power generator 2 as the control initiating power output and employing 5% of the power generated by the power generator 2 before change as the control initiating fluctuation amount has been described in each of the aforementioned first to third embodiments, the present invention is not restricted to this but values other than the aforementioned values may alternatively be employed. For example, the control initiating fluctuation amount may alternatively be determined on the basis of the rated output of the power generator. The magnitude of the control initiating power output is preferably larger than the control initiating fluctuation amount.

While the example of employing not more than 2 minutes as the standby time has been described in each of the aforementioned first to fourth embodiments, the present invention is not restricted to this but the standby time may alternatively be not less than 2 minutes. The standby time is preferably not more than the upper limit period T1 of the fluctuation period capable of being dealt with by the load frequency control (LFC), and more preferably not more than the lower limit period T2. The value of the lower limit period is also changed by a so-called run-in effect on the power grid side. The degree of the run-in effect is also changed in response to the prevalence, the regional dispersibility, etc. of the photovoltaic power generation system.

While the example of employing 101% and 99% of the generated power before change as the upper threshold and the lower threshold to determine that the generated power has returned to the value in the vicinity of the generated power before change, respectively has been shown in each of the aforementioned first to third embodiments, the present invention is not restricted to this but values other than these values may alternatively be employed as the upper threshold and the lower threshold. Furthermore, the values of the upper threshold and the lower threshold may alternatively be equal to each other without making the values different. For example, generated power equal to the generated power before change may alternatively be employed as the upper and lower common thresholds.

While the example of employing 1% of the generated power before change as the upper threshold and the lower threshold has been shown in each of the aforementioned first to fourth embodiments, the present invention is not restricted to this but the upper threshold and the lower threshold may not be 1% of the generated power before change. The thresholds set in the range of 1% of the generated power before change are employed to correspond to the control initiating fluctuation amount set at 5% of the generated power before change in each of the aforementioned first and second embodiments, but the thresholds may alternatively be changed corresponding to the control initiating fluctuation amount. For example, the thresholds may alternatively be set in the range of 2% of the generated power before change (the upper threshold and the lower threshold may alternately be 102% and 98% of the generated power before change, respectively) when the control initiating fluctuation amount is set at 10% of the generated power before change. The thresholds (upper threshold and lower threshold) are preferably within 20% of the control initiating fluctuation amount.

The present invention is not restricted to the specific numerical values of the sampling period, the bus voltage, etc. described in each of the aforementioned first to fourth embodiments but these specific numerical values can be properly changed.

While the example of providing the power output detection unit on each of the three power generators has been shown in the aforementioned second embodiment, the present invention is not restricted to this but a single power output detection unit may alternatively be provided on the three power generators.

While the example of controlling the charge/discharge of the battery cell 31 on the basis of the output signal of the sensor 203 detecting the on/off operation of the load 210 has been described in the aforementioned third embodiment, the present invention is not restricted to this but the charge/discharge of the battery cell 31 may alternatively be controlled on the basis of the output signal of a power sensor detecting the power consumption of the load 210.

While the example in which the controller 5 controls the DC-DC converter 33 to perform the charge/discharge control of the battery cell 31 has been shown in the aforementioned first embodiment, the present invention is not restricted to this. For example, a charge/discharge switch to charge/discharge the battery cell 31 may alternatively be provided on the charge/discharge portion 32, and the controller 5 may alternatively control the on/off operation of the charge/discharge switch to perform the charge/discharge control of the battery cell 31.

What is claimed is:

1. A charge/discharge control device linked to a power grid, employed in a power generation system comprising a power generator generating power with natural energy and a storage portion capable of storing power, and controlling charge/discharge of said storage portion,
so formed as to start charge/discharge control of said storage portion if an amount of change in power detected by a power detection portion detecting power passing through a prescribed portion of a line between said power generator and said power grid is at least a prescribed amount of change when detected said power changes from first power to second power while said detected power does not return to power in a vicinity of the first power from said second power within a first period from a time point when said detected power changes from said first power to said second power.

2. The charge/discharge control device according to claim 1, so formed as to determine that said power detected by said power detection portion does not return to said power in the vicinity of said first power from said second power if detected said power does not reach a prescribed threshold including a value in the vicinity of said first power or a value equal to said first power within said first period from the time point when said detected power changes from said first power to said second power.

3. The charge/discharge control device according to claim 2, wherein
said threshold includes a first threshold in the vicinity of said first power, larger than said first power and a second threshold in the vicinity of said first power, smaller than said first power,
the charge/discharge control device so formed as to determine that said detected power does not return to said power in the vicinity of said first power from said second power if said detected power changes in an increasing direction from said first power to said second power and does not decrease to not more than said first threshold within said first period, and determine that said detected power does not return to said power in the vicinity of said first power from said second power if said detected power changes in a decreasing direction from said first power to said second power and does not increase to not less than said second threshold within said first period.

4. The charge/discharge control device according to claim 1, so formed as to acquire data on said power detected by said power detection portion at a prescribed detection time interval, determine, based on said data on detected said power acquired at said prescribed detection time interval, whether or not an amount of change in said power detected by said power detection portion is at least a prescribed amount of change, and determine whether or not said detected power has returned to said power in the vicinity of said first power within said first period longer than said prescribed detection time interval.

5. The charge/discharge control device according to claim 4, wherein
said first period comprises a period of an integral multiple of at least twice said prescribed detection time interval.

6. The charge/discharge control device according to claim 1, wherein
said first period comprises a period of not more than a fluctuation period capable of being dealt with by load frequency control.

7. The charge/discharge control device according to claim 1, so formed as to calculate a target output value by a method of moving average, and render a period to acquire data on said detected power employed to calculate a moving average shorter than a period other than at least either an initial stage or a final stage of said charge/discharge control in at least either said initial stage or said final stage of said charge/discharge control to calculate said target output value, when performing said charge/discharge control of said storage portion.

8. The charge/discharge control device according to claim 7, so formed as to render said period to acquire said data on said detected power employed to calculate said moving average shorter than a period other than said initial stage and said final stage of said charge/discharge control in said initial stage of said charge/discharge control, and gradually increase, from said initial stage of said charge/discharge control to said period other than said initial stage and said final stage of said charge/discharge control, said period to acquire said data on said detected power employed to calculate said moving average in response to a number of pieces of said data on said detected power having been accumulated since start of said charge/discharge control to calculate said target output value.

9. The charge/discharge control device according to claim 7, so formed as to render said period to acquire said data on said detected power employed to calculate said moving average shorter than a period other than said initial stage and said final stage of said charge/discharge control in said final stage of said charge/discharge control, and gradually decrease, from said period other than said initial stage and said final stage of said charge/discharge control to said final stage of said charge/discharge control, said period to acquire said data on said detected power employed to calculate said moving average to calculate said target output value.

10. The charge/discharge control device according to claim 1, so formed as to acquire data on said detected power within a prescribed second period as a period to acquire said data on said detected power and calculate a target output value by a method of moving average when performing said charge/discharge control of said storage portion, wherein
said prescribed second period comprises a period of at least a lower limit period of a fluctuation period capable of being dealt with by load frequency control.

11. The charge/discharge control device according to claim 1, so formed as to terminate said charge/discharge control after elapse of a prescribed third period from start of said charge/discharge control.

12. The charge/discharge control device according to claim 11, so formed as to extend said prescribed third period of said charge/discharge control if a change of at least said prescribed amount of change in said power detected by said power detection portion is generated a prescribed number of times or more in said charge/discharge control.

13. A power generation system comprising:
a power generator linked to a power grid, generating power with natural energy;
a storage portion capable of storing power;
a power detection portion detecting power passing through a prescribed portion of a line between said power generator and said power grid; and
a controller controlling charge/discharge of said storage portion, wherein
said controller is so formed as to start charge/discharge control of said storage portion if an amount of change in power detected by said power detection portion is at least a prescribed amount of change when detected said power changes from first power to second power while said detected power does not return to power in a vicinity of said first power from said second power within a first period from a time point when said detected power changes from said first power to said second power.

14. The power generation system according to claim 13, wherein
said controller is so formed as to determine that said power detected by said power detection portion does not return to said power in the vicinity of said first power from said second power if detected said power does not reach a prescribed threshold including a value in the vicinity of said first power or a value equal to said first power within said first period from the time point when said detected power changes from said first power to said second power.

15. The power generation system according to claim 13, wherein
said power generator is so formed as to generate power with sunlight,
said controller is so formed as to acquire said power detected by said power detection portion at a prescribed detection time interval and determine, based on detected said power acquired at said prescribed detection time interval, whether or not an amount of change in said power detected by said power detection portion is at least a prescribed amount of change, and
said prescribed amount of change is larger than a maximum amount of change in said detected power at said prescribed detection time interval in the daytime in fine weather when said charge/discharge control is started.

16. The power generation system according to claim 13, further comprising:
an inverter provided on said line between said power generator and said power grid to link said power generator and said power grid to each other;
a DC-DC converter serially connected between said power generator and said inverter, converting a DC voltage of power generated by said power generator to a prescribed DC voltage; and
a charge/discharge portion performing the charge/discharge of said storage portion, wherein
said storage portion is connected in parallel to a connecting wire connecting said DC-DC converter and said inverter, and so formed as to store said power generated by said power generator,
said power detection portion is so formed as to detect generated said power of said prescribed DC voltage obtained by conversion of said DC voltage by said DC-DC converter, and
said controller is so formed as to start said charge/discharge control of said storage portion if an amount of change in said generated power of said prescribed DC voltage obtained by said conversion of said DC voltage by said DC-DC converter is at least said prescribed amount of change when said generated power changes from said first power to said second power while said generated power does not return to power in the vicinity of said first power from said second power within said first period from a time point when said generated power changes from said first power to said second power.

17. The power generation system according to claim 13, wherein
said power detection portion is so formed as to detect power generated by said power generator, and
said controller is so formed as to start said charge/discharge control of said storage portion if an amount of change in said power generated by said power generator is at least said prescribed amount of change when generated said power changes from first generated power to second generated power while said generated power does not return to power in a vicinity of said first generated power from said second generated power within the first period from a time point when said generated power changes from said first generated power to said generated second power.

18. The power generation system according to claim 17, wherein
said controller is so formed as to detect a change in an operation state of a load connected to said line between said power generator and said power grid, and perform said charge/discharge control of said storage portion to suppress a change in power input to/output from said power grid resulting from said change in said operation state of said load.

19. The power generation system according to claim 13, wherein said line between said power generator and said power grid is so formed as to be capable of connecting a load, said power detection portion is provided on a side closer to said power grid with respect to a portion of said line connected with said load and so formed as to detect power input to/output from said power grid, and said controller is so formed as to start said charge/discharge control of said storage portion if an amount of change in said power input to/output from said power grid is at least the prescribed amount of change when input/output said power changes from said first power to said second power while said input/output power does not return to power in the vicinity of said first power from said second power within the first period from a time point when said input/output power changes from said first power to said second power.

20. The power generation system according to claim 19, wherein said power detection unit includes at least either a purchase power detection portion detecting power purchased from said power grid or a sale power detection portion detecting power sold to said power grid.

\* \* \* \* \*